US008684886B2

(12) United States Patent  
Roberge et al.

(10) Patent No.: US 8,684,886 B2  
(45) Date of Patent: Apr. 1, 2014

(54) TRANSMISSION CONTROL SYSTEM AND METHOD THEREOF

(75) Inventors: Hubert Roberge, St-Nicéphore (CA); David Levasseur, Drummondville (CA); Francois Brind'Amour, Drummondville (CA)

(73) Assignee: CVTech Inc., Drummondville (CA)

( * ) Notice: Subject to any disclaimer, the term of this patent is extended or adjusted under 35 U.S.C. 154(b) by 354 days.

(21) Appl. No.: 13/107,847

(22) Filed: May 13, 2011

(65) Prior Publication Data

US 2011/0277577 A1 Nov. 17, 2011

Related U.S. Application Data

(60) Provisional application No. 61/334,189, filed on May 13, 2010.

(51) Int. Cl.  
*F16H 61/662* (2006.01)

(52) U.S. Cl.  
USPC .............................. 477/44; 477/42

(58) Field of Classification Search  
USPC ......... 477/42, 44, 46, 77, 80, 84, 90, 91, 115, 477/121, 132, 173–175, 902  
See application file for complete search history.

(56) References Cited

U.S. PATENT DOCUMENTS

| | | | |
|---|---|---|---|
| 4,566,415 A | 1/1986 | Iwai | |
| 4,964,318 A * | 10/1990 | Ganoung | 477/110 |
| 5,092,434 A * | 3/1992 | Smith | 477/39 |
| 5,406,483 A | 4/1995 | Kallis | |
| 5,417,193 A | 5/1995 | Fillman | |
| 5,890,470 A * | 4/1999 | Woon et al. | 123/350 |
| 5,979,582 A | 11/1999 | Hakansson | |
| 6,289,873 B1 | 9/2001 | Dunsworth | |
| 6,546,329 B2 * | 4/2003 | Bellinger | 701/115 |
| 7,072,754 B1 | 7/2006 | Sherrod | |
| 7,085,645 B2 | 8/2006 | Matsuda | |
| 7,183,904 B2 | 2/2007 | Katsuragawa | |
| 7,238,135 B2 * | 7/2007 | Coffey et al. | 475/210 |
| 7,288,047 B1 | 10/2007 | Hitt | |
| 7,292,932 B1 | 11/2007 | Ledger | |
| 7,351,184 B2 | 4/2008 | Fukushima | |
| 7,399,255 B1 | 7/2008 | Johnson | |
| 7,894,951 B2 | 2/2011 | Norris | |
| 7,900,739 B2 | 3/2011 | Bulgrien | |
| 7,953,538 B2 * | 5/2011 | Matsubara et al. | 701/99 |

(Continued)

OTHER PUBLICATIONS

Tony Lewin; Ford Fiesta, Focus and Powershift DCT; dctfacts.com; Oct. 2, 2010.

(Continued)

*Primary Examiner* — Justin Holmes  
(74) *Attorney, Agent, or Firm* — Mathieu Audet

(57) ABSTRACT

A method of managing a transmission ratio with an assisted CVT with a governed engine to emulate a hydrostatic transmission and prevent a drivebelt abuse is provided, the method comprising: providing a reference power source rotational speed, using the assisted CVT to transmit rotatable motion between a power source and a drive mechanism, managing a torque of the power source to maintain a substantially even rotational speed upon a power source load variation and modulating a transmission ratio of the assisted CVT to change the rotational speed of the drive mechanism. A system and a vehicle having such a drivebelt abuse preventing mechanism is also provided.

18 Claims, 22 Drawing Sheets

(56) References Cited

U.S. PATENT DOCUMENTS

| | | | |
|---|---|---|---|
| 8,055,414 B2* | 11/2011 | Tawara | 701/52 |
| 2002/0013654 A1 | 1/2002 | Masters | |
| 2002/0029913 A1 | 3/2002 | Ito | |
| 2003/0018423 A1 | 1/2003 | Saller | |
| 2003/0212483 A1 | 11/2003 | Folke | |
| 2003/0221885 A1 | 12/2003 | Calamari | |
| 2005/0149245 A1 | 7/2005 | Kilworth | |
| 2007/0107961 A1* | 5/2007 | Iwanaka et al. | 180/65.6 |
| 2008/0132379 A1* | 6/2008 | Matsubara et al. | 477/3 |
| 2009/0105041 A1* | 4/2009 | McKenzie et al. | 477/41 |
| 2012/0108384 A1* | 5/2012 | Tabata et al. | 477/3 |

OTHER PUBLICATIONS

Werner Schmitt, Andreas Patzer; ECU Software for Dry Dual Clutch has Stringent Requirements; Vector; Summary of Networking Competence 4th Edition; Feb. 2008; vector-worldwide.com.

* cited by examiner

TRANSMISSION CONTROL SYSTEM AND METHOD THEREOF

CROSS-REFERENCE

The present invention relates to and claims priority from U.S. Provisional Patent Application No. 61/334,189 filed May 13, 2010, entitled TRANSMISSION CONTROL SYSTEM AND METHOD, incorporated herein by reference.

TECHNICAL FIELD

The technical field relates to continuously variable transmissions. More precisely, the present invention relates to an assisted continuously variable transmission that is adapted to emulate a hydrostatic transmission.

BACKGROUND

Continuously variable transmissions (CVTs) are commonly used on a wide range of vehicles, such as small cars or trucks, snowmobiles, golf carts, scooters, all-terrain vehicles (ATV), etc. They often comprise a driving pulley mechanically connected to a motor, a driven pulley mechanically connected to wheels or a caterpillar, possibly through another mechanical device such as a gearbox, and a trapezoidal drivebelt transmitting torque between the driving pulley and the driven pulley. A CVT changes the ratio within certain limits as required by the operating conditions to yield a desired motor rotational speed for a given driven pulley rotational speed, the latter being generally proportional to the vehicle speed. A CVT may be used with all kinds of motors, for instance internal combustion engines, electric motors, windmills, etc. CVTs can also be used with other machines that are not vehicles.

Each pulley of a CVT comprises two members having opposite conical surfaces, which members are called sheaves. One sheave, sometimes called "fixed sheave", can be rigidly connected to one end of a supporting shaft while the other sheave, sometimes called "movable sheave", can be free to slide and/or rotate with reference to the fixed sheave by means of bushings or the like. The conical surfaces of the sheaves apply an axial force on the drivebelt. Moving the sheaves axially relative to each other changes the drivebelt operating diameter, thus the ratio of the CVT.

In order to transmit the motor torque, an axial force has to be applied in the driving and the driven pulleys. These axial forces can be generated by a plurality of possible mechanisms or arrangements. In a legacy mechanical CVT, the axial force in the driving pulley is often generated using centrifugal weights, spring and ramps. In a legacy driven pulley, this force is often generated using cam surfaces and a spring.

Generally, at a low vehicle speed, the operating diameter of the drivebelt at the driving pulley is minimal and the operating diameter at the driven pulley is maximal. This is referred to as the minimum ratio or the minimum ratio condition since there is the minimum number of rotations or fraction of rotation of the driven pulley for each full rotation of the driving pulley.

As the vehicle speed increases, so does the driven pulley rotational speed. For a given operating condition, a certain motor rotational speed is desired, thus a desired ratio can be calculated. The CVT actuation mechanism is provided to set the CVT to the appropriate ratio.

Generally, when the rotational speed of the driving pulley increases, its movable sheave moves closer to the fixed sheave thereof under the effect of an actuation mechanism, for instance a centrifugal mechanism or another kind of actuation mechanism. This constrains the drivebelt to wind on a larger diameter at the driving pulley. The drivebelt then exerts a radial force on the sheaves of the driven pulley in addition to the tangential driving force by which the torque received from the motor is transmitted. This radial force urges the movable sheave of the driven pulley away from the fixed sheave thereof, thereby constraining the drivebelt to wind on a smaller diameter at the driven pulley. A return force, for instance a return force generated by a spring of the driven pulley and/or by another biasing mechanism, often counterbalances the radial force. It may also be counterbalanced by a force generated by the axial reaction of the torque applied by the drivebelt on the driven pulley, which force often results from the presence of a cam system and/or another biasing mechanism that tend(s) to move the movable sheave towards the fixed sheave as the torque increases. A cam system may comprise a plurality of ramp surfaces on which respective followers can be engaged. The followers can be sliding buttons or rollers, for instance. The set of ramp surfaces or the set of followers is attached to the movable sheave. The other set is directly or indirectly attached to the fixed sheave and is in a torque-transmitting engagement with the main shaft supporting the driven pulley. The closing effect of the cam system on the drivebelt tension is then somewhat proportional to the torque received from the motor.

Generally, at the maximum vehicle speed, the ratio is maximum as there is the maximum number of rotations or fraction of rotation of the driven pulley for each full rotation of the driving pulley.

There are two ways to slow down a vehicle equipped with a CVT. Firstly by reducing the throttle to reduce the engine's torque to decrease the RPM. That affects the centrifugal force on the drive pulley thus reducing pressure on the drive belt. The opening of the drive pulley is also supported by the tension in the drivebelt induced by the pressure applied by the pre-tensed spring of the driven pulley. Secondly, the vehicle is going to slow down if the road load is higher than the available engine's torque, the engine RPM is going to slow down and the drive pulley is going to open. The increased torque applied on the drive belt is going to increase the pinching of the drivebelt by the driven pulley.

Some CVTs are provided with an integrated clutch function. The clutch function can be on the drivebelt or be provided by a mechanism incorporated in the CVT. For instance, when the CVT has a clutch function on the drivebelt, the opposite walls of the fixed sheave and the movable sheave of the rotating driving pulley can be designed to be sufficiently apart that they are not in a driving engagement with the sides of the drivebelt. The drivebelt is then not moving and some models of driving pulleys have a bearing provided between the two sheaves. The outer race of such bearing supports the drivebelt when the driving pulley is in a disengaged position. Then, when the operating conditions are such that clutching is required, the actuation mechanism of the driving pulley moves the sheave walls closer relative to each other. The sheave walls eventually make contact with the sides of the drivebelt. At this point, an axial force is applied by the actuation mechanism on the drivebelt. The amount of torque transferred to the drivebelt is somewhat related to this axial force applied by the actuation mechanism. At one point, enough friction/force is generated between the sheave walls and the drivebelt to produce a significant force transfer between the driveshaft and the drivebelt, thereby causing torque from the motor to be transferred as a driving force on the drivebelt. This driving force is transferred to the driven pulley of the CVT.

Generally, torque applied on the drivebelt will result in vehicle acceleration at some point. The drivebelt will then accelerate in relation to vehicle speed. At start-up, the slippage between the driving pulley sheaves and the drivebelt is high, but decreases as the drivebelt accelerates, to the point where it becomes negligible and the driving pulley is considered fully engaged.

Assisted CVTs are advantageous because they do not relate on the centrifugal force generated by the rotation of the sheaves like legacy mechanically actuated CVTs. In contrast, an electrically actuated CVT, also called assisted CVT or eCVT, uses an electric motor and an adapted gearbox to set the distance between both drive sheaves to set the transmission ratio. This gives the flexibility of using a specific CVT ratio in reaction of predetermined conditions regardless of the centrifugal force applied on the drive pulley. Despite the advantages provided by an assisted CVT, it is appreciated that the assisted CVT can be used in such a manner that it can overheat the drivebelt.

An assisted CVT can be used in many helpful ways, for instance, the operation of an engine at constant speed may be desirable for performing some tasks. The load applied to the engine can vary and therefore have an effect on the speed of the engine. Some types of engines are provided with an engine controller configured to increase the amount of fuel injected in the engine to keep the engine running at substantially constant speed when the load applied thereto increases. However, the engine controller can hardly help sustaining a constant engine speed when a load is applied thereto and even more when the load exceeds the maximum torque the engine can provide at a specific rotational speed. An engine controller maintains a constant engine rotational speed and compensates load variations by managing the throttle until the engine reaches it maximum torque output. Therefore, it might be desirable to use the assisted CVT, which is disposed between the engine and the drive mechanism providing the load applied to the engine, to help the engine remains at constant speed despite significant load variations applied thereon.

Keeping a constant engine rotational speed and use the transmission to change the speed of a machine can be made with a hydrostatic transmission. A hydrostatic transmission consists of a variable-displacement pump and a fixed or variable displacement motor, operating together in a closed circuit. In a closed circuit, fluid from the motor outlet flows directly to the pump inlet, without returning to the tank. As well as being variable, the output of the transmission pump can be reversed, so that both the direction and speed of motor rotation are controlled from within the pump. This eliminates the need for directional and flow (speed) control valves in the circuit. Because the pump and motor leak internally, which allows fluid to escape from the loop and drain back to the tank, a fixed-displacement pump called a charge pump is used to ensure that the loop remains full of fluid during normal operation. The charge pump is normally installed on the back of the transmission pump and has an output of at least 20% of the transmission pump's output. In practice, the charge pump not only keeps the loop full of fluid, it pressurizes the loop to between 110 and 360 PSI, depending on the transmission manufacturer. A simple charge pressure circuit comprises the charge pump, a relief valve and two check valves, through which the charge pump can replenish the transmission loop. Once the loop is charged to the pressure setting of the relief valve, the flow from the charge pump passes over the relief valve, through the case of the pump or motor or both, and back to tank. Hydrostatic transmissions have nonetheless several drawbacks. Namely their expensive price and their lack of efficiency because of the huge loss in fluid friction.

Thus, a need has been felt for an improved assisted CVT over the prior art. It is therefore desirable to use an assisted CVT in order to emulate a hydrostatic transmission or to keep running an engine at constant speed while managing the output speed of the machine with the assisted CVT. It is also desirable to provide an assisted CVT having a load-limiting mechanism adapted to transfer a limited amount of load to the engine in order to keep the engine running at constant speed. Another need has been felt over the existing art for an assisted CVT adapted to limit the torque transmitted to an engine and adapted to provide a signal and take actions when the assisted CVT reaches its transmission ratio limit. It is also desirable to provide means for preventing drivebelt overheating.

SUMMARY

It is one aspect of the present invention to alleviate one or more of the drawbacks of the background art by addressing one or more of the existing needs in the art.

An embodiment of the present invention provides an electrically assisted CVT adapted to be operatively mounted between an engine and a drive system to in order to set a significantly constant engine rotational speed and use the assisted CVT to manage the speed of the vehicle to emulate a hydrostatic transmission.

An embodiment of the present invention provides a system comprising an engine, an assisted CVT, a drive mechanism, a governor, a drive mechanism ratio control, a power source rotation speed control, wherein, upon setting an engine rotational speed with the power source rotation speed control, a driver, with the drive mechanism ratio control, can manage the rotational speed of the drive mechanism with the assisted CVT and wherein the governor manages the throttle to keep equilibrium between the engine's torque and the load applied thereon by the drive mechanism. The assisted CVT being adapted to backshift when the governor reaches the maximum torque of the engine to prevent the engine to stall.

An embodiment of the present invention provides a transmission system adapted to transmit all available torque produced by an engine with an assisted CVT right after substantial engagement completion of the assisted CVT.

An embodiment of the present invention provides a management system adapted to disconnect a vehicle speed and an engine rotational speed with an assisted CVT.

An embodiment of the present invention provides a method of managing an assisted CVT ratio independently of the vehicle speed and the engine rotational speed.

An embodiment of the present invention provides an assisted CVT adapted to manage the mechanical torque sustained by the engine by changing the CVT ratio.

An embodiment of the present invention provides a control system adapted to manage the assisted CVT ratio in respect with the load applied to the engine from the drive system.

An embodiment of the present invention provides an assisted CVT adapted to modulate the load applied to an engine and reduce the load transmitted to the engine when the load exceeds the maximum applicable torque of the engine by backshifting the assisted CVT ratio.

An embodiment of the present invention provides an assisted CVT using the speed and the displacement of a driver-managed actuator to manage the engagement speed and the transmission ratio of the assisted CVT.

An embodiment of the present invention provides an assisted CVT adapted to modulate the load applied to an engine and increase the load transmitted to the engine when the load is less than the maximum applicable torque of the engine by upshifting the assisted CVT ratio.

An embodiment of the present invention provides an assisted CVT adapted to adjust its transmission ratio to manage the load applied to the engine and also adapted to instigate drivebelt heating prevention actions, like stalling the engine, when the assisted CVT reaches its operating limit.

An embodiment of the present invention provides an assisted CVT adapted to adjust its ratio to manage the load applied to the engine and also adapted to uncouple the engine when the assisted CVT reaches its operating limit.

An embodiment of the present invention provides an assisted CVT adapted to adjust its ratio to manage the load applied to the engine and also adapted to send a signal to user graphical interface when the assisted CVT reaches its operating limit.

An embodiment of the present invention provides an assisted CVT adapted to adjust its ratio to manage the load applied to the engine and also adapted to partially disengage and let slip the drivebelt when the assisted CVT reaches a predetermined value.

An embodiment of the present invention provides a method of managing a transmission ratio with an assisted CVT, the method comprising: providing a reference power source rotational speed; using the assisted CVT to transmit rotatable motion between a power source and a drive mechanism; managing a torque of the power source to maintain a substantially even rotational speed upon a power source load variation; and modulating a transmission ratio of the assisted CVT to change the rotational speed of the drive mechanism.

An embodiment of the present invention provides a system for emulating a hydrostatic transmission comprising an assisted CVT adapted to interconnect a power source with a drive mechanism with a transmission ratio, the power source being adapted to be maintain a rotational speed; a management module adapted to manage the assisted CVT; an engagement behavior control connected to the management module; a power source rotational speed control connected to the management module; and a drive mechanism ratio control connected to the management module, the management of the assisted CVT ratio being made on the basis of an actuation of the drive mechanism ratio control.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

DETAILED DESCRIPTION

Figure 1:
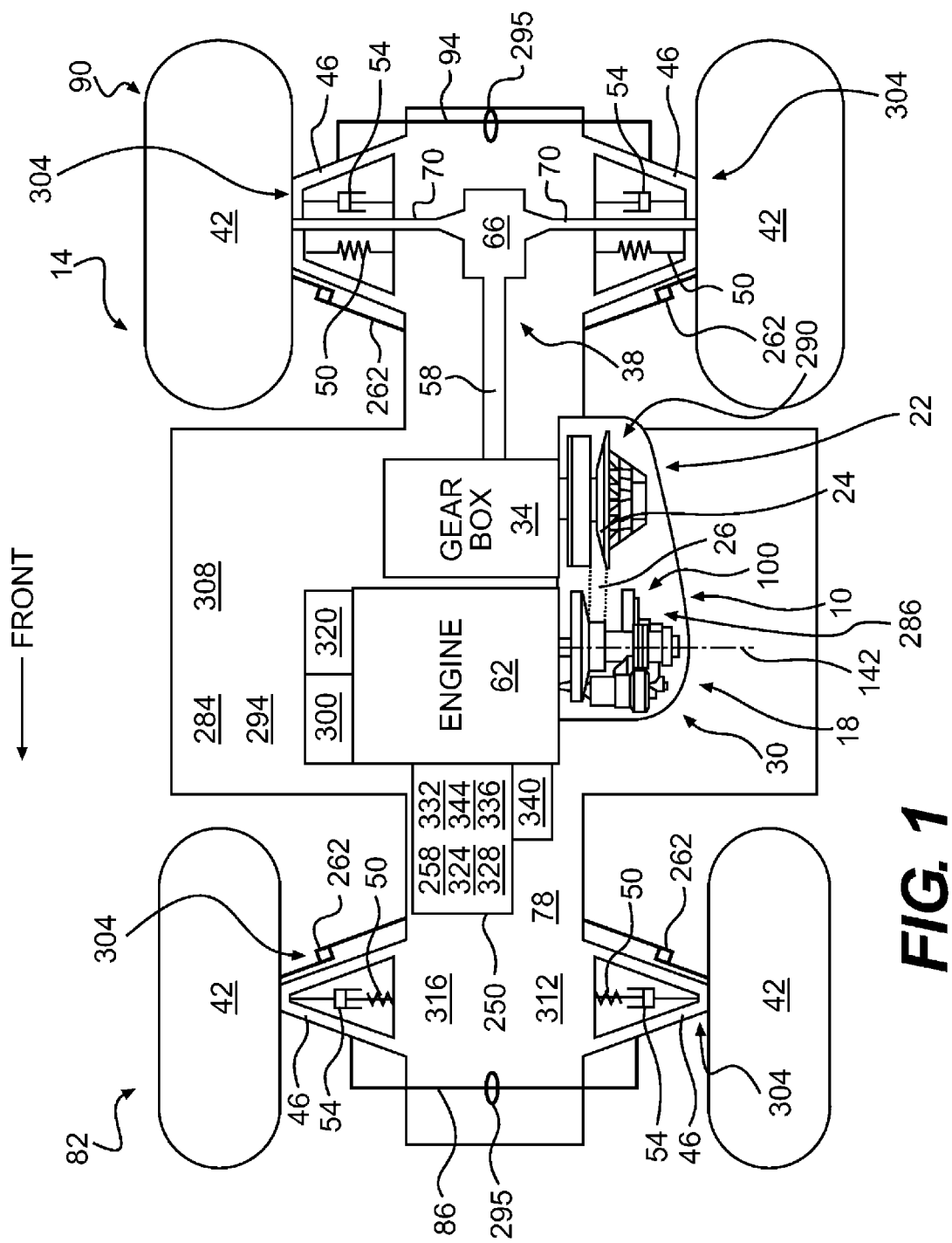
FIG. 1 shows a schematic illustration of a top plan view of a wheeled vehicle with an electronically controlled CVT thereon in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In respect with an embodiment of the invention, FIG. 1 illustrates an electronically controlled CVT 10 disposed in an exemplary vehicle 14. The CVT 10 includes a drive portion 18 and a driven portion 22 interconnected therebetween with a drivebelt 26. The drive portion 18 is provided with a CVT assisting mechanism 30 adapted to set the operating ratio of the CVT 10. In the present embodiment, the driven portion 22 is secured to an optional gearbox 34 to transmit rotational power to the drive mechanism 38 of the vehicle 14. The gearbox 34 is not required if the driven portion 22 of the CVT 10 already rotates at a desired output speed.

The vehicle 14 schematically illustrated on FIG. 1 is equipped with four wheels 42 like an off-road vehicle (e.g. all-terrain vehicle . . . ) or a road vehicle (e.g. car, golf cart . . . ). Although it is not hereby illustrated, the vehicle 14 could also be a snowmobile, a scooter, a motorcycle, an industrial vehicle or any other devices without departing from the scope of the present invention.

The illustrated vehicle 14 has suspension arms 46 with interconnected springs 50 and dampers 54. The drive mechanism 38 of the vehicle 14 includes a primary drive shaft 58 operatively connected between an engine 62 and a differential 66, and a pair of drive axles 70 operatively interconnected with the wheels 42. The illustrated vehicle 14 is equipped with a rear wheel drive system. It is understood that the present invention applied to a front wheel drive vehicle 14 or a four-wheel drive vehicle 14 would work in a similar fashion and is encompassed by the present explanations. Also, we use the term "wheel" throughout the present description although the present invention does not solely relate to wheeled vehicles but to all vehicle having ground-contacting members intended to support and propel the vehicle 14. Each wheel 42 supports a chassis 78 with interconnected suspension arms 46, springs 50 and dampers 54. The front pair of wheels 82 is interconnected with a front torsion bar 86 pivotably secured to the chassis 78 while the rear pair of wheels 90 is interconnected with a rear torsion bar 94 also pivotably secured to the chassis 78. The torsion bars 86 and 94 are torsioned or twisted when the vehicle 14 is subject to roll to improve the vehicle's handling. A number of sensors are identified in FIG. 1. They will be described in further details belong in reference with FIG. 9 after the mechanical aspect has been described.

Figure 2:
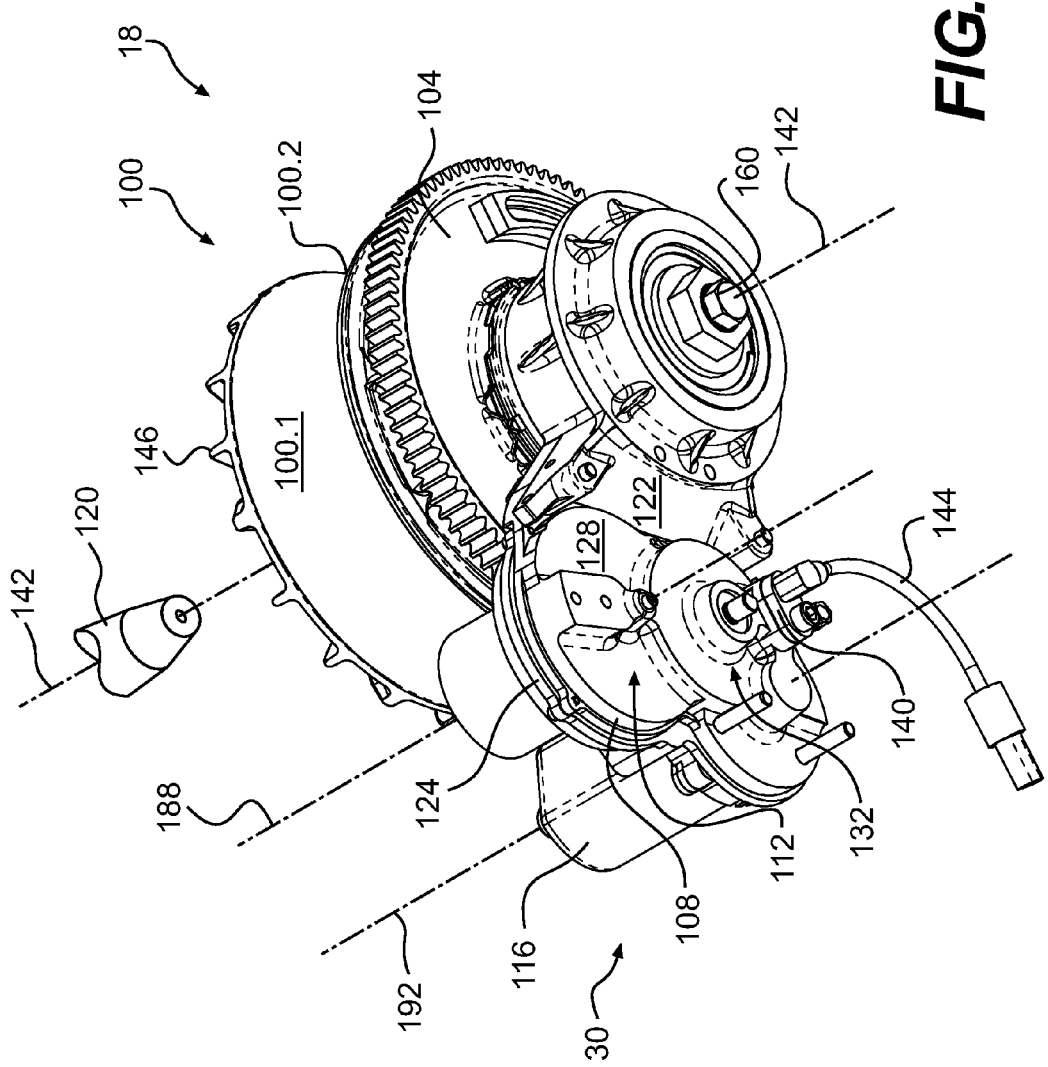
FIG. 2 is a magnified isometric view of a drive portion of the electronically controlled CVT in accordance with an embodiment of the present invention.
Figure 3:
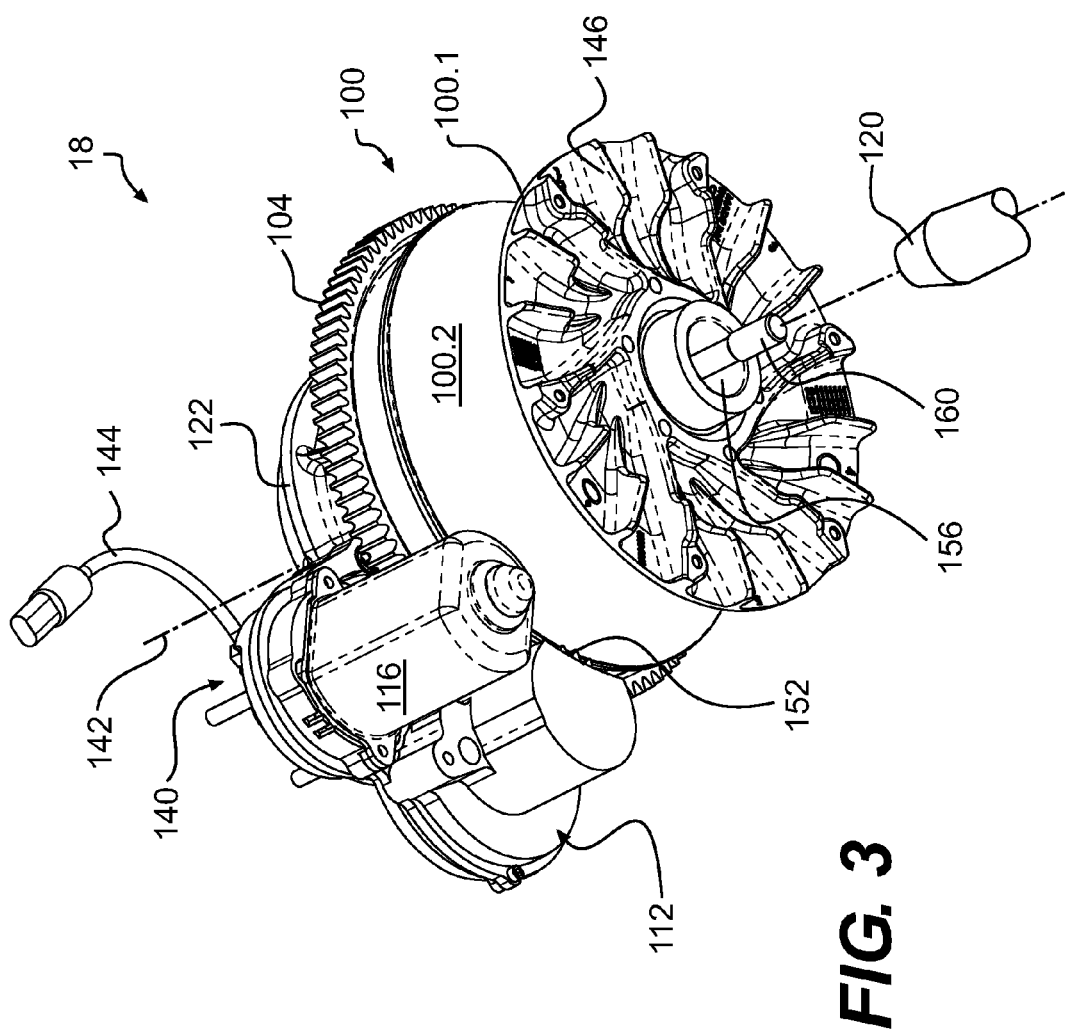
FIG. 3 is an alternate magnified isometric view of the drive portion of FIG. 2 in accordance with an embodiment of the present invention.

FIG. 2 and FIG. 3 illustrate in more details the drive portion 18 of the CVT 10. The drive portion 18 of the CVT 10 comprises a drive pulley including a pair of opposed drive sheaves 100, a main actuation gear 104, a frame 108, a gearbox 112 and an electric actuation motor 116. In the present embodiment, the assisting mechanism 30 is a compact layout cooperating with the drive sheaves 100 and removably secured to a power drive 120 of the engine 62 (i.e. an internal combustion engine or an electric motor not shown in FIG. 2 or another power source). The electric actuation motor 116 is secured to the frame 108 and adapted to rotate a plurality of operatively interconnected gears housed in the gearbox 112 to ultimately rotate the main actuation gear 104 at a desired speed.

The frame 108 of the assisting mechanism 30 of the present embodiment consists of two frame portions 124, 128 and a support portion 122 secured thereto. The frame 108 is adapted to receive and secure the electric actuation motor 116 thereon. The frame 108 is also configured to enclose a set of gears 132 therein acting as an actuation gearbox 112 to obtain a desired transmission ratio between the electric actuation motor 116 and the main actuation gear 104. A sensor 140 is attached to the frame 108 to sense the position of the set of gears 132 to monitor their position. The sensor 140 is provided with a connecting wire 144 connectable to a wires vehicle or a power pack harness (not shown) to communicate with a control module (not shown). The frame 108 in the presented embodiment is illustratively made of a light and strong material, like aluminum.

The opposed drive sheaves 100 are concentrically secured to the power drive 120 of the engine 62 and adapted to rotate with the power drive 120 about a drive axis 142. The opposed sheaves 100 of the illustrated embodiment includes an axially fixed sheave 100.1 and an axially moveable sheave 100.2 as shown in FIG. 2 and FIG. 3. An alternate embodiment could have a design that moves the sheave 100.1 that is proximally disposed in respect with the engine 62 and keep the other sheave 100.2 longitudinally fixed in respect of the drive axis 142. As best seen in FIG. 3, the fixed sheave 100.1 is equipped with a series of radial blades 146 adapted to act as an air pump to move air around the CVT 10 to cool nearby heated parts.

The present embodiment illustrates that the main actuation gear 104 is secured on a female threaded body 148 (visible in FIG. 4 and FIG. 5) that, upon rotation, transforms the rotation of the main actuation gear 104 into a precise axial movement that impacts the axial distance between the sheaves 100. It is the axial position of the axially moveable sheave 100.2 (distal in respect with the engine 62) that changes while the fixed sheave 100.1 remains axially at the same position. Any rotation of the electric actuation motor 116 is therefore transformed into a change in distance between both sheaves 100.1, 100.2 of the drive pulley 100 to alter the transmission ratio of the CVT 10. As a skilled reader can understand, the axially moveable sheave 100.2 of another embodiment could remain longitudinally fixed while it is the other sheave 100.1, proximal to the engine 62, that is longitudinally movable.

Figure 4:
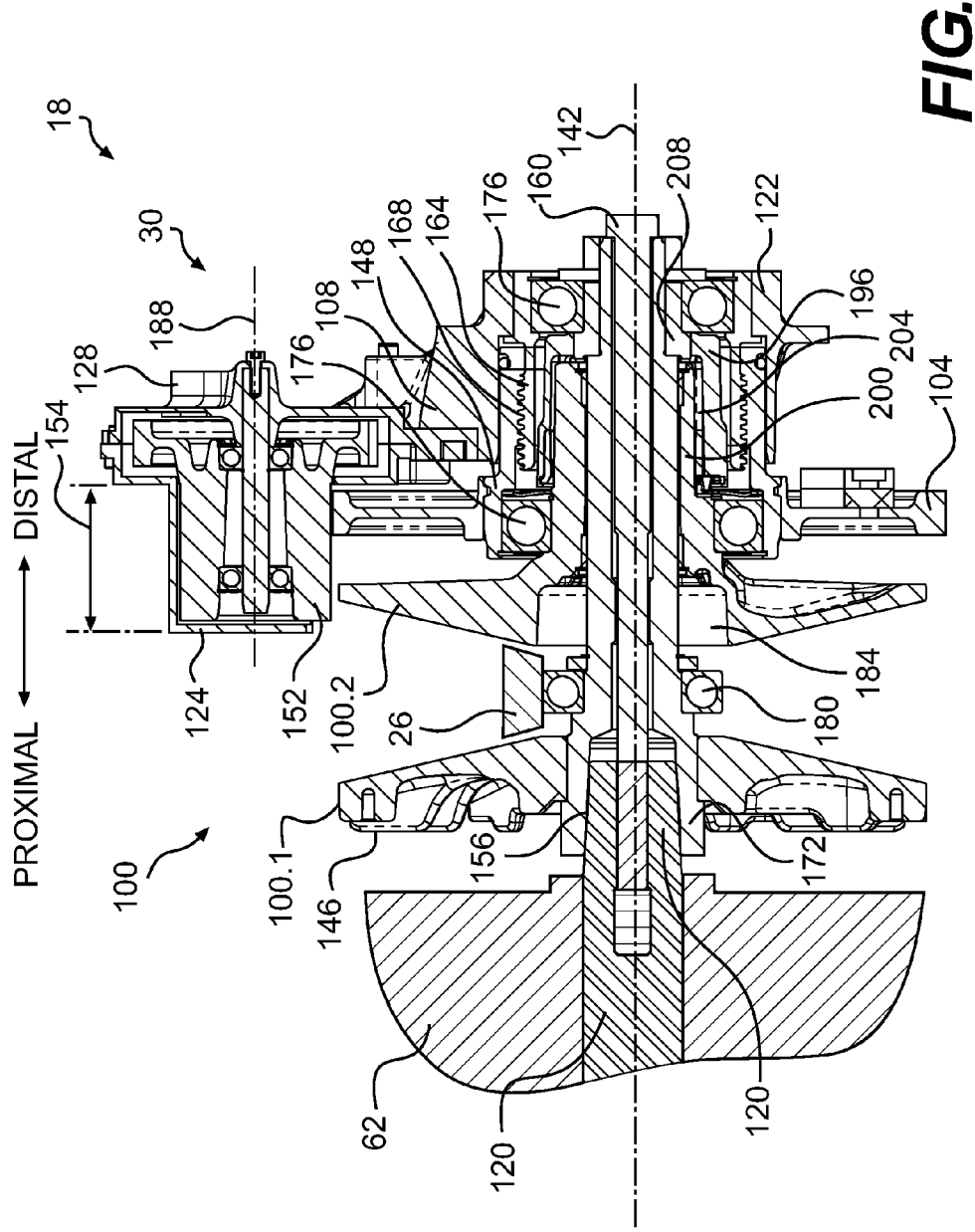
FIG. 4 is a section view of the drive portion illustrated on FIG. 2 and FIG. 3 where the sheaves are not in contact with the drivebelt and in accordance with an embodiment of the present invention.

The drive portion 18 of the embodied assisted CVT 10 is secured in cantilever on the power drive 30 as it can be seen in FIG. 4. It can be appreciated from FIG. 4 that the drive portion 18 is adapted to be secured to the power drive 120 with a cooperating self-centering female taper socket 156 and a long fastener 160 going through the drive portion 18, concentrically with the pair of sheaves 100.

As it is better seen in FIG. 4, the electric actuation motor 116 is operatively connected to the gearbox 112 (not visible in FIG. 4 but is shown in FIG. 3 among other figures) that, itself, is operatively connected to the main actuation gear 104 via an elongated gear 152. The elongated gear 152 is provided with substantially long teeth thereof to accommodate a complete teeth-engaging axial displacement 154 thereon of the main actuation gear 104 that is adapted to longitudinally move along the elongated gear 152 with the axially moveable sheave 100.2.

FIG. 4 illustrates the configuration where the sheaves 100 are disposed at their maximum distance therebetween. The main actuation gear 104 is thus distally contacting the elongated gear 152. In contrast, FIG. 5 illustrates the same CVT 10 in a configuration where the sheaves 100 are disposed at their closest distance therebetween; it is possible to appreciate that this time the main actuation gear 104 contacts the elongated gear 152 on the proximal side.

One can see from FIG. 4 that the main actuation gear 104 is removably secured to a female threaded body 148 rotated thereby upon actuation of the electric actuation motor 116. The female threaded body 148 engages a counterpart male threaded body 164, which is secured to the frame 108, to create a threaded interface 168 therebetween. A rotational movement of the female threaded body 148 is therefore transformed into an axial movement due to the threaded interface 168. The female threaded body 148 experiences the entire axial displacement because the male threaded body 164 does not longitudinally move relatively to the frame 108 and the axial shaft 172. This axial displacement of the female threaded body 148 is communicated by the main actuation gear 104, which is rotated by the elongated gear 152. In other words, the electric actuation motor 116, fixedly connected to the frame 108, can apply a controlled rotational displacement of the main actuation gear 104 to axially move the axially moveable sheave 100.2 via the threaded interface 168.

Still referring to FIG. 4, the assisting mechanism 30 is supported by the distal end of the rotating axial shaft 172. A pair of intervening support bearings 176 allows rotational movements between the assisting mechanism 30 and the axial shaft 172. The pair of support bearings 176 also allows the assisting mechanism 30 to be selectively angularly secured about the axial shaft 172 when the electronically controlled CVT 10 is positioned and secured in its final operative layout.

Figure 5:
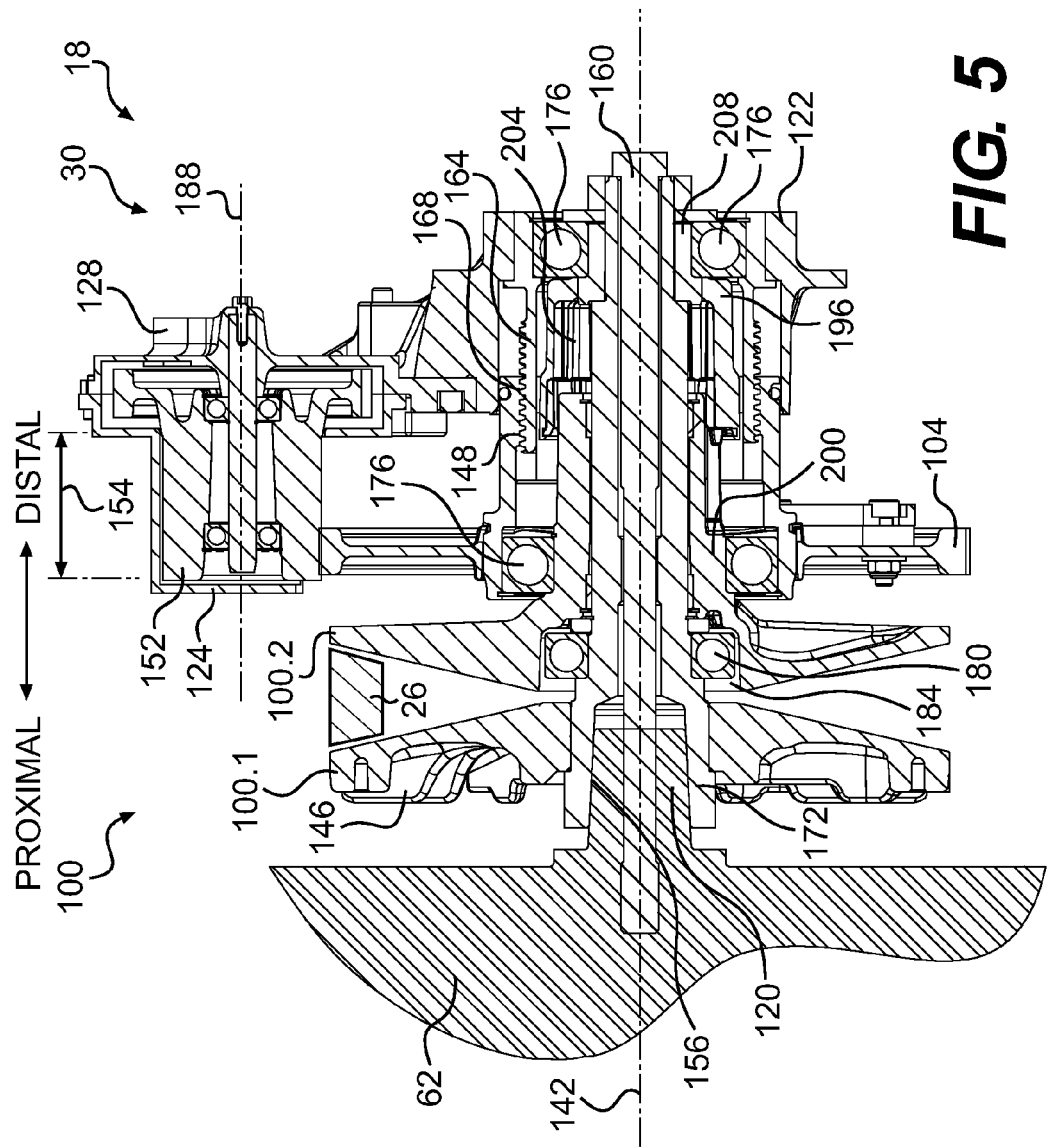
FIG. 5 is a section view of the drive portion illustrated on FIG. 2 and FIG. 3 where the sheaves are in contact with the drivebelt and in accordance with an embodiment of the present invention.

The elongated gear 152, well illustrated in FIG. 4 and in FIG. 5, is elongated because it is operatively engaging the axially moveable main actuation gear 104. The elongated gear 152 is longitudinally fixedly positioned in respect with the distal end of the axial shaft 172 and has an effective axial displacement length 154 that corresponds to the axial displacement of the main actuation gear 104 that is at least as long as the maximum operating axial distance variation between both sheaves 100.

In reference with FIG. 2 through FIG. 5, the axis 188 of the elongated gear 152 is parallel with the drive axis 142. The elongated gear 152 extends outside the periphery of the axially moveable sheave 100.2 and is driven by the main actuation gear 104 that has a diameter that is larger than the diameter of the axially moveable sheave 100.2. The rotation axis 192 of the electric actuation motor 116 is parallel with the drive axis 142. Similarly, the electric actuation motor 116 extends outside the periphery of the axially moveable sheave 100.2.

Still referring to FIG. 4 and FIG. 5 where is illustrated a neutral bearing 180 disposed on the axial shaft 172 between the sheaves 100. A cavity 184 is formed in the axially moveable sheave 100.2 to receive the neutral bearing 180 therein when both sheaves 100 are closer to engage and rotate the drive belt 26 on a larger operating diameter. The neutral bearing 180 supports the drive belt 26 and prevents it to contact and rub against the rotating axial shaft 172 when both sheaves 100 are distanced enough from each other by the assisting mechanism 30 to disengage the sides of the drive belt 26 from the sheaves 100. The CVT is in the "neutral" position (meaning the belt 26 is not driven by the drive pulley 100) when the drive belt 26 is laterally uncompressed between the sheaves 100. The sheaves 100 continue to rotate with the power drive 120 when the CVT is in the "neutral" position. The axially moveable sheave 100.2 is coupled to the axially fixed sheave 100.1 by the axial shaft 172 and rotates when the CVT is in the "neutral" position. Reducing the distance between both sheaves 100 with the assisting mechanism 30 reengages the drive belt 26. The friction between the drive belt 26 and both sheaves 100 progressively engages the drive belt 26 until the drive belt 26 is propelled by the rotating sheaves 100. Put differently, the electronically controlled CVT 10 in accordance with the present embodiment is equipped with a disengagement mechanism. The disengagement mechanism is not a centrifugal clutch as commonly used in legacy CVTs. Disengagement is produced by managing the distance between the sheaves 100 of the drive pulley with the assisting mechanism 30 to a point where the drivebelt 26 does not operatively contact the sheaves 100 nor the axial shaft 172 and freely rests on the neutral bearing 180. Reengagement of the drivebelt 26 is managed by the assisting mechanism 30 by reducing the distance between the sheaves 100 to contact and move the drive belt 26 to rotate the driven portion 22. Clutching can be considered complete when actual clutching completion is not yet completed for the purpose of the illustrated example. Clutching completion could be considered completed when, for example, 80% actual clutching completion is reached, in order for the management system to anticipate the actual clutching completion of the assisted CVT 10. Alternatively, a separate clutch, such as a electronically controlled clutch (not lustrated) disposed between the power drive 120 and the drive pulley 100, can be used in embodiments of the invention that keep the drivebelt 26 engaged with the drive pulley 100. In the latter situation the engagement of the transmission is mage through the electronically controlled clutch instead of using the assisted CVT 10 itself.

Figure 6:
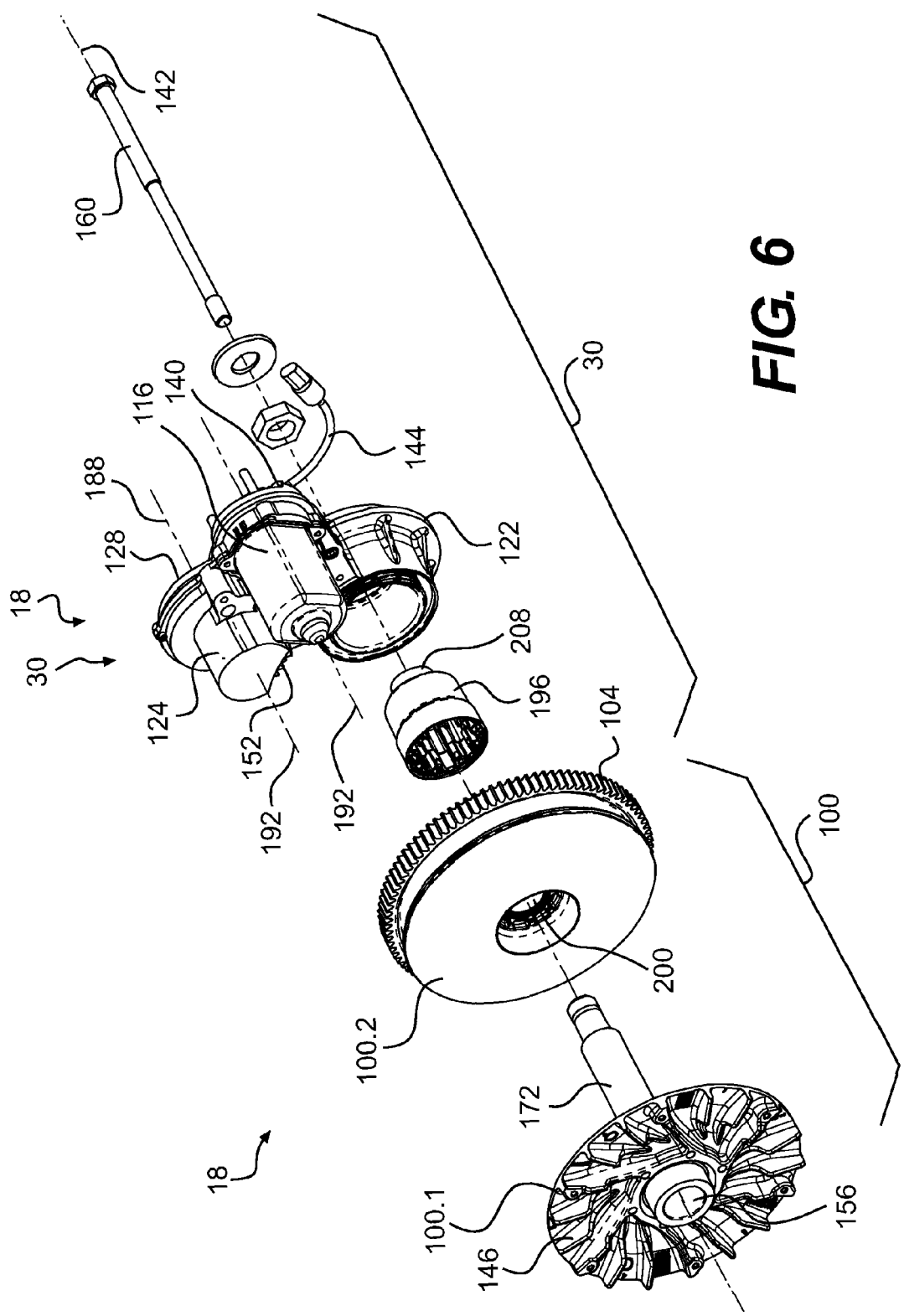
FIG. 6 is a semi-exploded dimetric view of the drive portion of the electronically controlled CVT of FIGS. 2, 3, 4 and 5 in accordance with an embodiment of the present invention.
Figure 7:
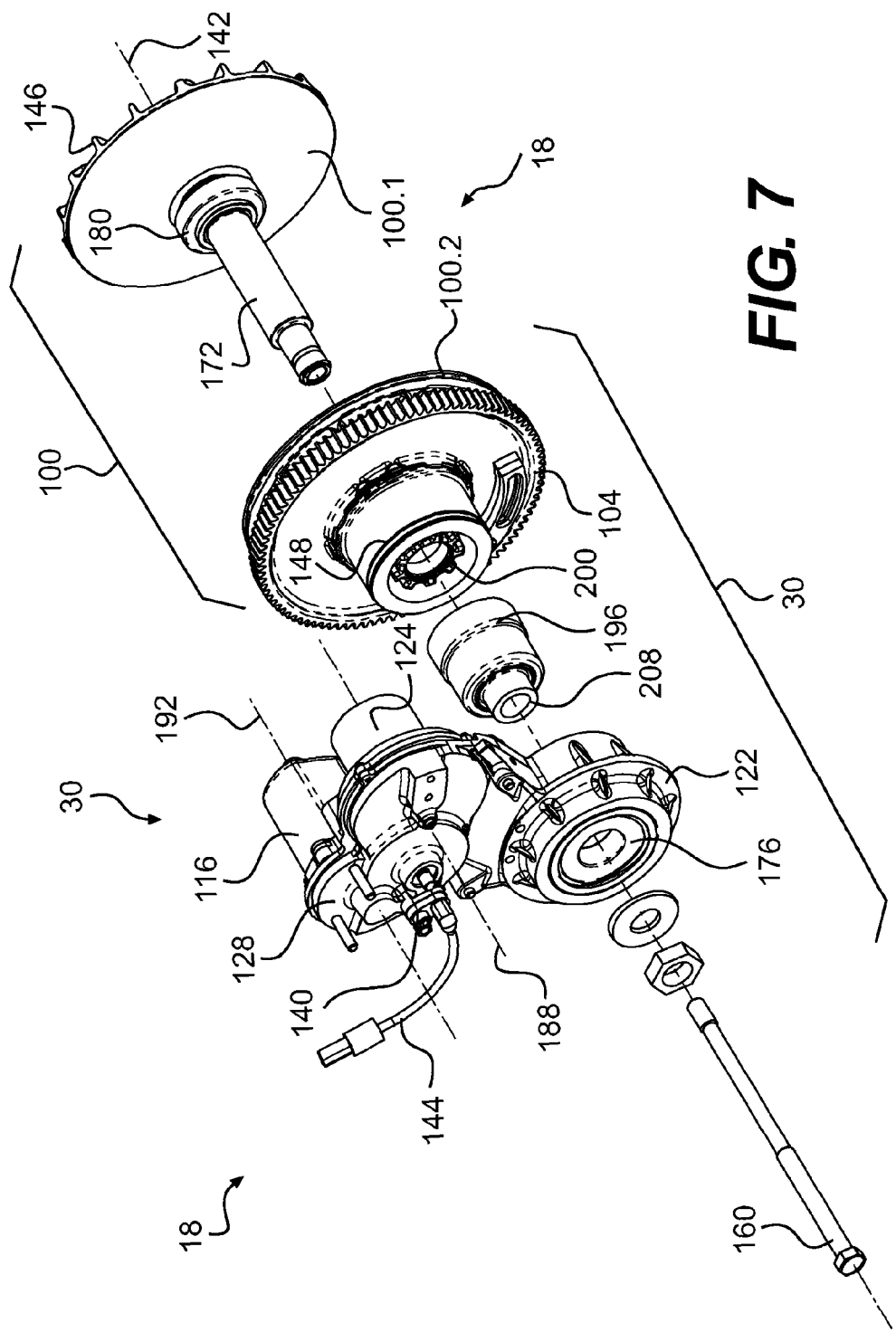
FIG. 7 is an alternate semi-exploded dimetric view of the drive portion of the electronically controlled CVT of FIGS. 2, 3, 4 and 5 in accordance with an embodiment of the present invention.

FIG. 6 and FIG. 7 depict a semi-exploded drive portion 18. The axially fixed sheave 100.1 (left) is adapted to receive the axially moveable sheave 100.2 (right) on the axial shaft 172 extending therefrom. The hollowed axial shaft 172 is sized and designed to receive the long fastener 160 therein to secure the assembly to the power drive 120 of the engine 62.

Figure 8:
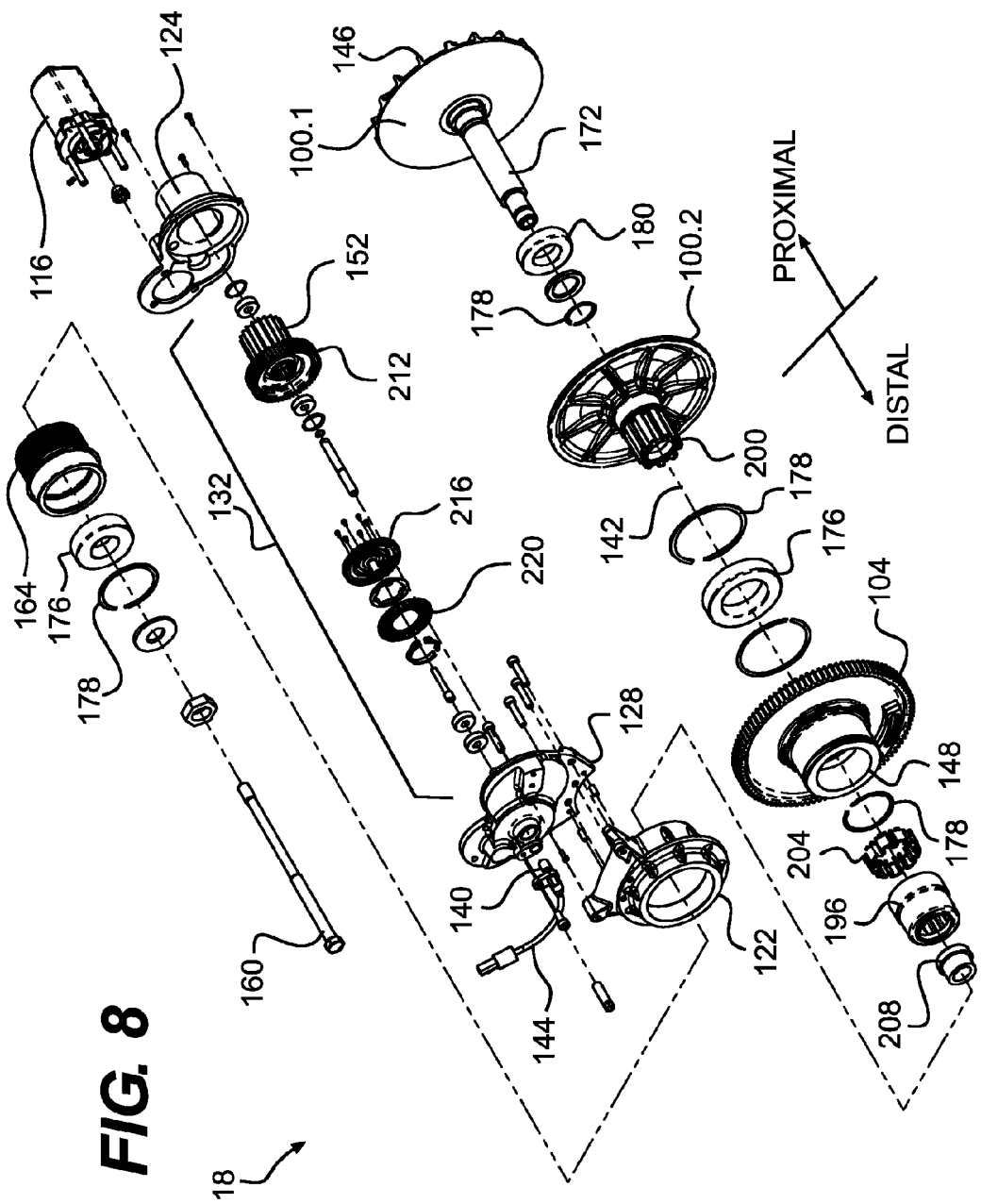
FIG. 8 is an exploded dimetric view of the drive portion of the electronically controlled CVT of FIGS. 2, 3, 4 and 5 in accordance with an embodiment of the present invention.

Turning now to FIG. 8 illustrating in more details an embodiment of the present invention. The exploded view of the drive portion 18 of the CVT 10 depicted in FIG. 8 teaches in further details how the drive portion 18 is assembled. Beginning with the fixed sheave 100.1, from which extends the axial shaft 172 on which is assembled thereon the axially moveable sheave 100.2. The main actuation gear 104 is fixedly secured to the female threaded body 148 that is adapted to cooperate with corresponding male threaded body 164. The male threaded body 164 is secured to the support portion 122 and acts as an abutment when the female threaded body 148 is screwed thereon and is moving axially, following the threads of the threaded interface 168 created thereby. The longitudinal displacement of the female threaded body 148 moves both the main actuation gear 104 and the axially moveable sheave 100.2. Bearings 176 intervene between the female threaded body 148 and the axially moveable sheave 100.2 to prevent the main actuation gear 104 to rotate with the sheaves 100 and the axial shaft 172. The male threaded body 164 and the female threaded body 148 could be inverted, if properly designed, such that the male threaded body 164 receives the main actuation gear 104 thereon.

An intervening slider member receptacle 196 is provided to support the distal end of the axial shaft 172 and to support thereon the support portion 122 of the assisting mechanism 30. The slider member receptacle 196 also slideably receives therein the protruding end 200 of the axially moveable sheave 100.2 and supports thereon its associated main actuation gear 104. The cylindrical external shape of the slider member receptacle 196 is sized and designed to fit in corresponding opening in the support portion 122 and to accommodate a slider member 204 therein. The slider member 204 intervening between the internally located distal protruding end 200 of the axially moveable sheave 100.2 and the internal shape of the slider member receptacle 196. The slider member 204 has a shape adapted to transmit rotational movement while allowing a smooth axial movement between the distal end of the axially moveable sheave 100.2 and the slider member receptacle 196. The slider member 204 also acts as a vibration damper between the two components thus preventing or reducing possible rattles. Additionally, a bearing-receiving unit 208 is concentrically mounted at the distal end of the slider member receptacle 196 to support the distal end of the rotating assembly by rotatably engaging a bearing 176 secured in the fixed male threaded body 164.

Still in FIG. 8, the elongated gear 152 is associated with an adjacent larger gear 212 and other gears 132 to further change the gear ratio. Complementary gears 216 and 220 are arranged to provide a proper teeth-moving frequency for the sensor 140 to sense. The sensor 140 senses when each teeth of the gear 220 passes nearby and changes state and/or sends a signal thereof to a control system (not shown) monitoring and managing the assisting mechanism 30.

Figure 9:
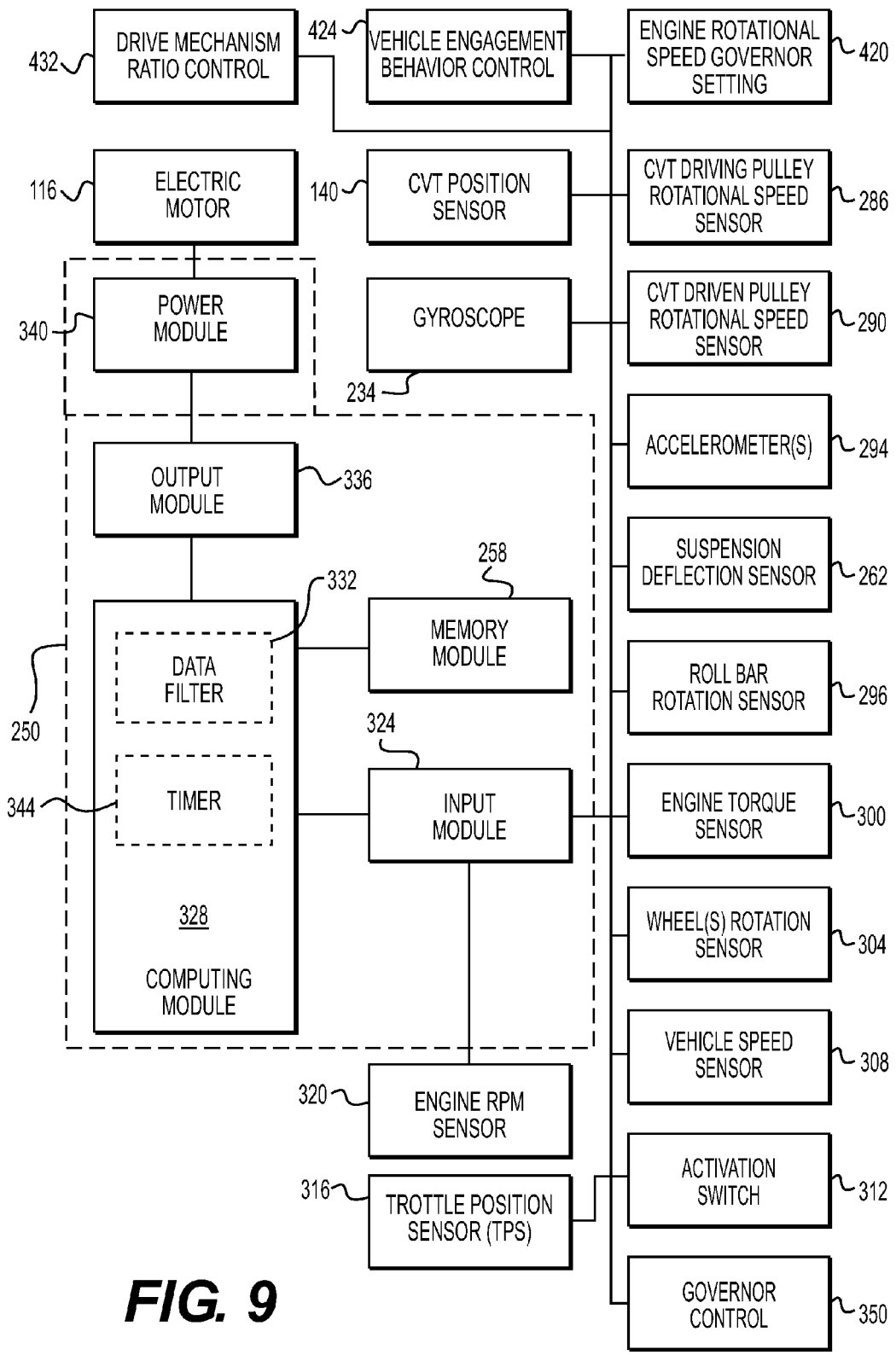
FIG. 9 is a bloc diagram of a system in accordance with an embodiment of the present invention.

As previously indicated in respect with an embodiment of the invention, the active strategy requires a plurality of sensing elements illustrated in FIG. 9. The electronically controlled CVT 10 is provided with an electric motor 116 adapted to set the distance between both sheaves 100 and define the desired transmission ratio of the CVT 10. The electric motor 116 is operatively connected to a management module 250 configured to send a signal to power the electric motor 116—or directly power the electric motor 116 if there is a power system therein—to change the transmission ratio of the CVT 10. The management module 250 is connected to a plurality of sensors 140, 262, 284, 290, 294, 296, 300, 304, 308, 312, 316 and 320 to receive signals therefrom that are used to detect the behaviors of the vehicle 14 and to manage management of the assisted CVT 10 and other elements of the vehicle 14 when required.

The CVT drive pulley 100 rotational speed sensor 286 is disposed on the CVT drive portion 18 to provide a signal representative of the rotating speed of the drive pulley 100. The CVT drive pulley 100 rotational speed sensor 286 could alternatively be the rotational output speed of the engine's drive 120 provided by an engine rotational speed sensor 320. Similarly, a CVT driven pulley rotational speed sensor 290 is disposed on the CVT driven portion 22 to provide a signal representative of the rotating speed of the driven pulley 24. A throttle position sensor 316 (TPS) also provides a signal representing how much throttle is applied on the engine 62 at a given time. Additionally, a governor position sensor 350 is provided to sense the position of a governor 354 that will be discussed below in more details. A multiple axes accelerometer 294 (X, Y, Z) is optionally disposed on the vehicle 14 to provide a signal representative of a longitudinal acceleration, transversal acceleration, vertical acceleration, roll, pitch and yaw of the vehicle 14. Accelerometers having less sensing capabilities might be used alone or collectively without departing from the scope of the present application. A suspension deflection sensor 262 is monitoring the position of at least one suspension component.

As it can be appreciated in FIG. 1 and FIG. 9, a roll bar rotation sensor 296 is operatively affixed to the roll bar 86 to sense the angular position of the roll bar 86 on the vehicle 14. The roll bar rotation sensor 296 is preferably centrally mounted to the roll bar 86 to get equal angular displacement from a right or a left side roll. Further, additional sensors like an engine torque sensor 300 and an engine rotational speed sensor 320 properly mounted to the engine 62 provide data about the instant state of the engine 62. Each wheel 42 is preferably equipped with a rotation sensor 304 configured to transmit data about the rotational speed of each wheel 42. A vehicle speed sensor 308 is also used to provide data about the speed of the vehicle 14. The vehicle 14 speed can also be obtained from a single wheel rotation sensor 304 or a combination of wheel rotation sensors 304. A significant difference between the rotating speeds of the wheels 42 can be an indication that one or many wheels 42 are airborne. A gyroscope 284 can alternatively be used to detect when the vehicle 14 gets airborne with the support of at least one other sensor, like the suspension deflection sensor 262, to differentiate when the vehicle 14 rolls.

All the aforementioned sensors are connected to an input module 324 relaying signals and/or data from each sensor to the computing module 328 to be filtered by the data filter 332 and computed in accordance with an appropriate algorithm. A memory module 258 is also provided to record data therein, like the speed of the vehicle 14, over time. The computed data sends a corrective signal to an output module 336 that relays signals to a power module 340 to power the electric motor 116 schematically illustrated in FIG. 9. The computing module 328 of the present embodiment is further provided with a timer 344 used to "time stamp" various signals received from sensors to be processed later, if required, in accordance with selected algorithms.

The internal combustion engine 62 of embodiments of the present disclosure is equipped with a fuel intake system and an ignition system. The fuel intake system is adapted to inject predetermined amounts of fuel and air mixture in the engine 62 through an air intake. Duration of the injectors (not illustrated) opening and fuel pressure determine the amount of fuel injected in the combustion chamber. A throttle 444 (butterfly) mechanically restricts the opening of the air intake to manage the engine 62 rotational speed. As previously mentioned, the engine 62 is equipped with a governor 354, which is a device used to measure and regulate the speed of a machine, such as an engine 62. Basic governors 354 sense the engine rotational speed and sometimes load of a prime mover and manage the engine 62 (the power source) to maintain the desired rotational speed. It is typical to find governors 354 on stationary engines and vehicles. Generally, the control is performed by a centrifugal system composed of spring and weights but many other types of controllers exist depending on the engine technology. Therefore, the governor 354 is associated with the engine 62 to automatically adjust the amount of fuel injected in the engine 62 to produce more or less torque at a specific engine rotational speed.

The governor 354 actions can be explained in three different situations. First, when the engine 62 is under constant load, the governor 354 holds steady the throttle 444 to keep the engine 64 at the desired rotational speed to produce more or less torque to maintain the engine 64 at a specific engine rotational speed. Second, under increasing engine load, the actual rotational speed is less than the desired rotational speed and the governor 354 automatically opens the throttle 444 to reach equilibrium, and third, under decreasing engine load, the actual rotational speed is higher than the desired rotational speed and the governor 354 automatically manages the throttle 444 to reach equilibrium.

Different types of engines 62 can require a different arrangement of components. For instance, a diesel engine 62 will be more efficiently affected by a centrifugal engine fuel pump controlling the amount of fuel injected in each cylinder than an action on the throttle 444 due to its particular configuration. In contrast, opening or closing the throttle 444 would more efficiently manage a typical gas engine 62.

Figure 10:
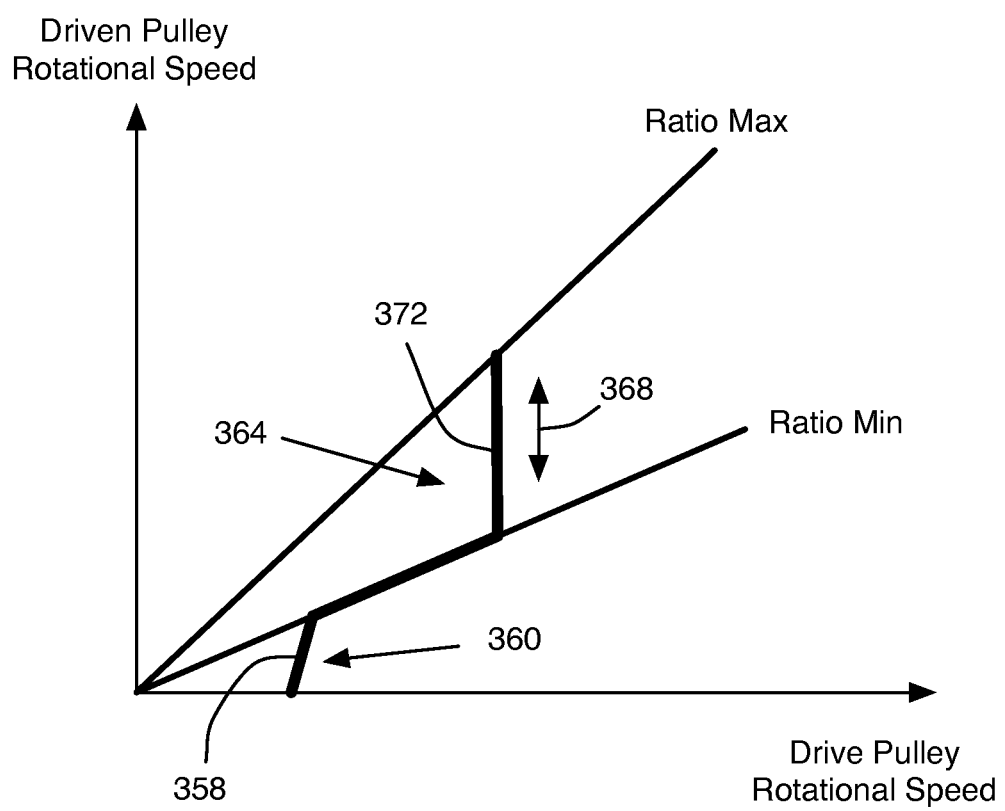
FIG. 10 is a schematic graph of the relation between a driven pulley rotational speed and a drive pulley rotational speed in accordance with an embodiment of the present invention.

Moving now to FIG. 10 illustrating a graph of relative rotational speeds between a drive pulley and a driven pulley of a CVT at wide-open throttle (WOT) 358. There is an engagement phase 360, when the driven pulley begins rotating till it is substantially engaged with the drivebelt 26, and a ratio control phase 364 where the CVT can manage the operating ratio between a minimum transmission ratio and a maximum transmission ratio. The CVT can therefore be used to increase or decrease 368 the transmission ratio 372 between the drive mechanism 38 and the engine 62; hence changing the load transmitted from the drive mechanism 38 to the engine 62. Alternatively, the engagement can be made with a separate centrifugal clutch (not illustrated) while keeping the drivebelt 26 engaged with the drive pulley 100.

Figure 11:
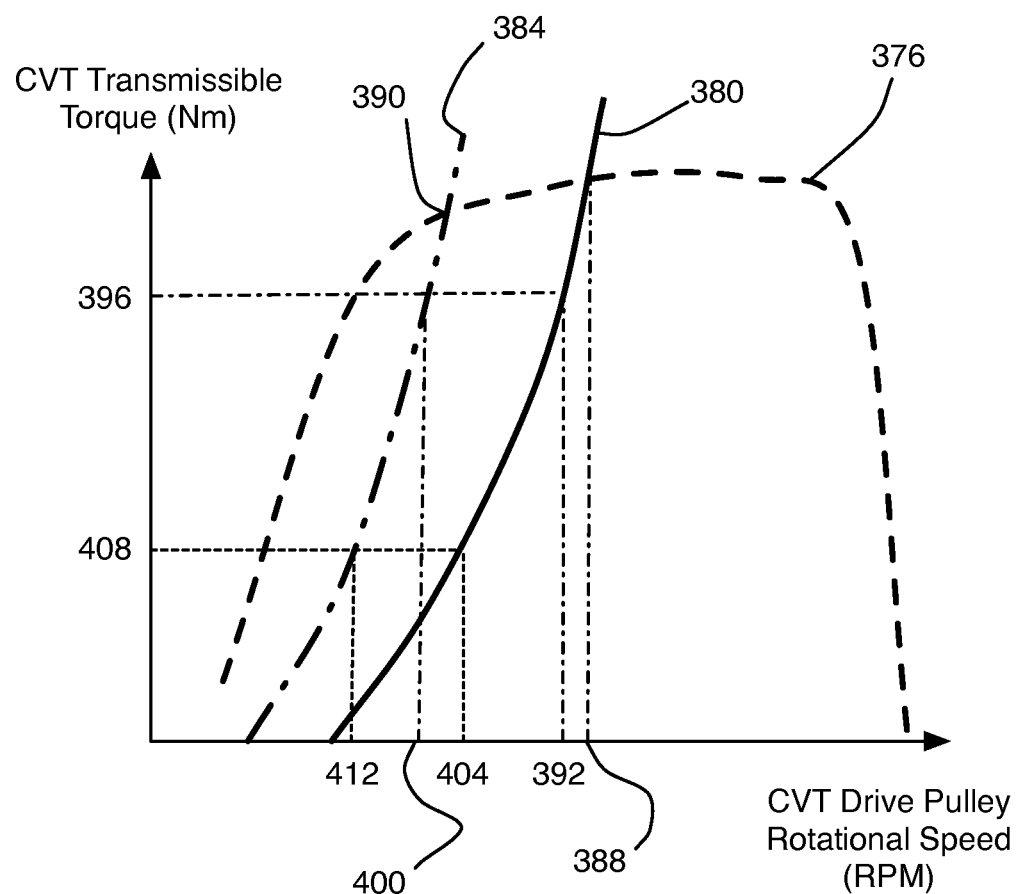
FIG. 11 is a torque v. RPM graph of an exemplary engine illustrating the behaviors of a mechanical CVT and an assisted CVT in accordance with an embodiment of the present invention.

An assisted CVT 10 provides distinctive advantages compared to a legacy mechanical CVT when the engagement is performed on the drivebelt 26. The graph illustrated in FIG. 11 illustrates the input torque at the CVT 376 in function of the CVT drive pulley 100 rotational speed. The solid curve 380 represents, for instance, a legacy CVT transmissible torque at minimum CVT ratio. The intersection between the input torque curve 376 and the transmissible torque 380 is the stall speed 388 where the legacy CVT cannot transmit more torque for a given CVT rotational speed because the CVT is limited by the centrifugal force producing the pinching force exercised on the drivebelt 26. In contrast, the dotted line 384 represents a possible assisted CVT 10 transmissible torque. The intersection between the input torque curve 376 and the transmissible torque 384 is the assisted CVT 10 stall speed 390 where the assisted CVT 10 cannot transmit more torque for a given assisted CVT rotational speed because the pinching force of the assisted CVT 10 is limited by the strength of the assisting mechanism 30.

In the illustrated situation, the curve 380 shows that for a given drive pulley rotational speed 392 it is possible to transmit a determined torque 396. Whereas, an assisted CVT 10, represented by the dotted line curve 384, can transmit the same determined torque 396 with a much lower rotational speed 400. The assisted CVT 10 operating range is therefore increased as the same torque can be transmitted to a much lower CVT speed with an assisted CVT 10 compared to traditional centrifugal CVTs. In a case of a utility vehicle 14, the operator could pull a heavier load with a slower vehicle speed without any drivebelt 26 slipping. This is often desirable in a situation where the utility vehicle is equipped with a loading bucket and the operator wants to load the bucket with material. This operation is made at low speed while a significant load is applied on the vehicle. This advantage provided by the assisted CVT 10 is mainly possible because the pinching of the assisted CVT 10 is not proportional to the centrifugal force applied to the drive pulley 100 but managed by an algorithm and applied to the drivebelt 26 with the electric actuation motor 116. The position of curve 384 is arbitrary and could be located at a different location on the graph, if desirable, with appropriate control. One can appreciate that the same phenomenon can be obtained at a lower drive pulley rotational speed 404, for a lower transmissible torque 408, and still observe that the assisted CVT 10 can transmit the same amount of torque 408 at a substantially lower rotational speed 412. In other words, the assisted CVT 10 can decrease the drive pulley 100 engagement rotational speed and be shaped according to the inputs provided to the management module 250 and the algorithms used to determine the assisted CVT 10 behavior.

Figure 12:
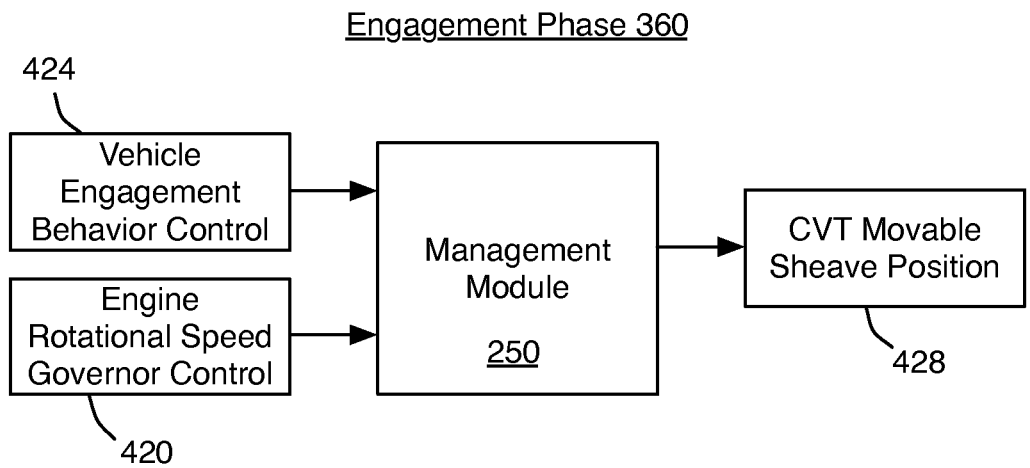
FIG. 12 is a block diagram of an exemplary engine in accordance with an embodiment of the present invention.
Figure 13:
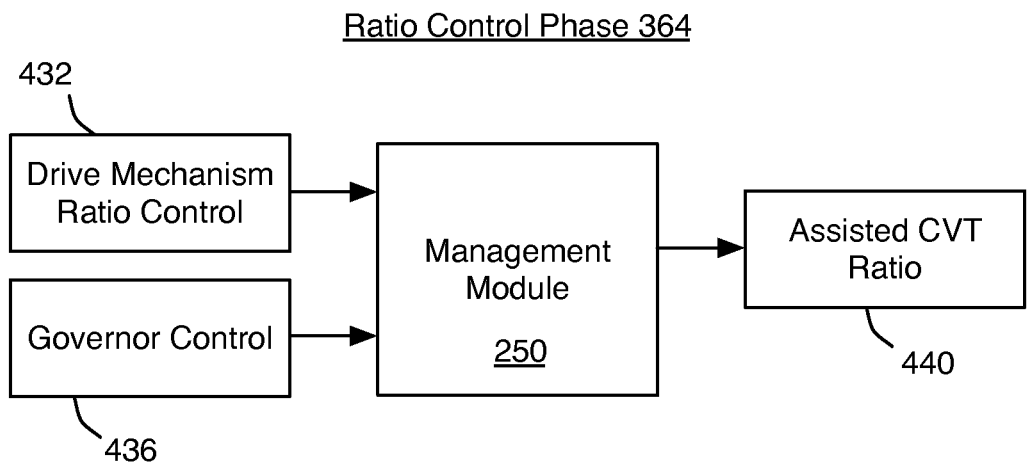
FIG. 13 is a block diagram of an exemplary engine in accordance with an embodiment of the present invention.

As we have established above in respect with FIG. 10, there is an "engagement phase" 360, of which a basic system is illustrated in the flow chart of FIG. 12, and a "ratio control phase" 364, of which a basic system is illustrated in the flow chart of FIG. 13. More precisely, as it can be appreciated in FIG. 12, the "engagement phase" 360 is controlled by management module 250 or an equivalent engine management module (not illustrated). The engine rotational speed is set with the governor control 420 and the governor setting position is sent to the control module 250. For instance, an operator of an equipment or a user of a vehicle powered by the engine 62 can set the engine rotating speed at a desired level before using the power of the engine 62 in a usable fashion (e.g. propel a vehicle or power an industrial equipment). This is often desirable for stationary machinery or for performing a cruise control function on a vehicle 14. This is also analogous to a hydrostatic transmission (for hydraulic transmissions) where the engine rotating speed is set independently from the actuator managing the speed of the vehicle 14. With this embodiment of the invention, the engine rotating speed is set and the drive mechanism 38 is not connected yet to the engine 62 to receive power from the engine 62 until the assisted CVT 10 is engaged as further explained below.

The management module 250 is going to reference the engine rotation speed governor control 420 with engine mappings stored therein to determine the available torque. The engine rotational speed governor control 420, used to set the engine rotating speed through the governor 354, can come in the form of a pedal, a lever, a rotatable handle or push buttons connected to the governor 354, which manages the fuel system 100 and/or the throttle 112, that automatically changes the throttle 444 position of the engine to set a desired engine rotating speed that is also going to be maintained by the governor 354. The management module 250 is going to use another input, concerning the vehicle engagement behavior control 424 (that could also be referred to as a "power source engagement behavior control"), preferably actuated by a user, to determine the assisted CVT movable sheave position 428. Once the engine rotational speed governor control 420 is selected, the vehicle engagement behavior control 424 is actuated (for instance by the rider of the vehicle or the operator of the equipment) to engage the assisted CVT 10 to progressively couple the engine 62 to the drive mechanism 38. The assisted CVT movable sheaves 100 are set to a desired relative position in accordance with the desired engagement intensity communicated by the rotational speed governor control 420 or the desired vehicle engagement behavior control setting 424 actuated by the user. The vehicle engagement behavior control 424 can be any sort of devices capable of providing a modulated signal, normally between 0% and 100%, to the assisted CVT 10. For example, the vehicle engagement behavior control 424 can be a pedal or a lever (not shown).

During the engagement phase 360, the signal from the vehicle engagement behaviour control 424 travel is used between 0%-100% of its travel by the management module 250 to quantify to which level the driver wants to accelerate the vehicle 14 (or the stationary machine). Also, during this phase, the engine rotational speed and vehicle speed are monitored to determine the degree of slippering between the drivebelt 26 and the sheaves of the drive pulley 100. The management module 250, via proper algorithms, controls the distance between the sheaves 100.1, 100.2 to achieve clutching completion. Clutching completion of the assisted CVT 10 can be reached when a certain percentage of clutching completion (e.g. 80% clutching completed) is obtained or when there is no more slippage between the drive pulley sheaves 100 and the drivebelt 26. In the present situation, clutching completion of an assisted CVT 10 is considered to be obtained at −80% of the assisted CVT 10 clutch travel. The position of the assisted CVT movable sheaves 100 in the engagement phase 360 is not considered a transmission ratio because the drivebelt 26 is not completely engaged with the drive pulley 100 and slippering still occurs.

Figure 22:
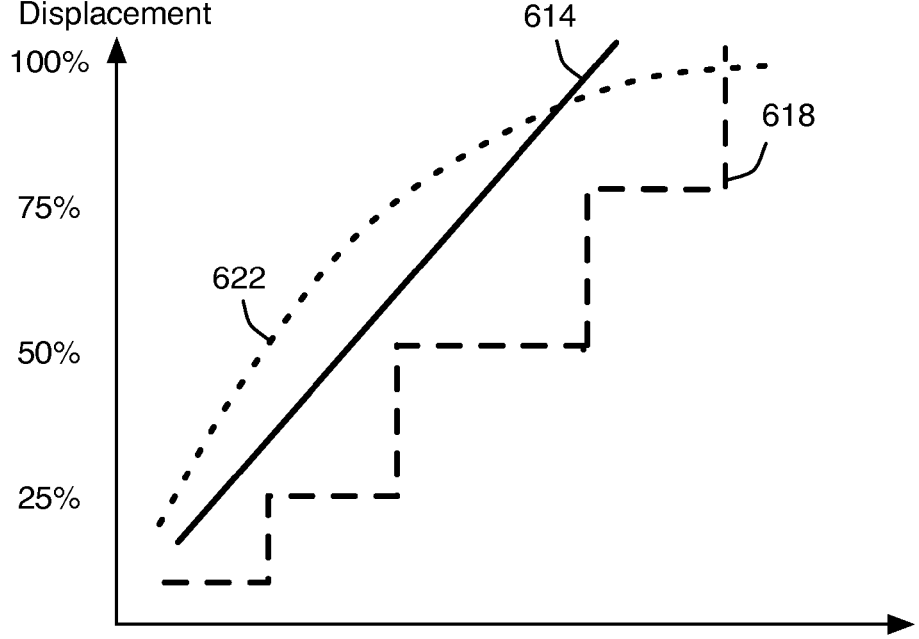
FIG. 22 is a graph of a drive mechanism ratio control displacement vs drive pulley sheaves positions mapping of various operating conditions of an assisted CVT in accordance with an embodiment of the present invention.

The reading of the vehicle engagement behavior control 424 is going to influence the CVT movable sheave position 428. A rapid actuation thereof can be interpreted as a driver's desire to accelerate rapidly. Put differently, the vehicle engagement behavior control 424 movements that can translate user's driving intentions. A slow acceleration will be read as a small and/or slow actuation of the vehicle engagement behavior control 424. In contrast, a fast acceleration is going to be inferred by a pronounced and rapid actuation thereof. This is going to be discussed below in respect with FIG. 22 and FIG. 23.

After the engagement phase 360 is completed, the management module 250 changes to another phase called "ratio control" phase 364. We use an analogous flow chart in FIG. 13 illustrating the ratio control phase 364. The management module 250 considers different inputs in the ratio control phase 364 although a drive mechanism ratio control 432 can be the same physical actuator as the vehicle engagement behavior control 424 used in the engagement phase 360. Typically, the management module 250 receives an input from the drive mechanism ratio control 432 representing the user's intent to maintain a certain speed (as the engine rotational speed is set independently), accelerate or decelerate, rapidly or softly, the drive mechanism 38 of the vehicle 14. The assisted CVT ratio 440 is going to be modulated in response to the drive mechanism ration control 432. In turn the position of the governor control 436 is going to send data to the management module 250 related to the desirable engine rotational speed increase or decrease to keep load equilibrium. In other words, the engine rotational speed can remain fixed while the governor 354 is going to manage the torque provided by the engine 14 and the assisted CVT is going to change the transmission ratio based on the reading of the drive mechanism ratio control 432 actuated by the driver. This is sort of a hydrostatic transmission emulation.

The embodiments illustrated in FIG. 12 and FIG. 13 are electronically connected for illustrative purpose. However, certain elements can be directly and mechanically connected without departing from the scope of the present invention. An exemplary operative mechanical link between governor control 436 and the throttle 444 is common. Typical mechanical operative connections between the drive mechanism 38, the assisted CVT 10 and the engine 62 are illustrated in bold in FIG. 14. A throttle 444 or a butterfly managing the engine 62 rotational speed is actuated by the governor 354 that itself is managed by the governor control 436. In turn, the management module 250, via the electric actuation motor 116, manages the assisted CVT 10 ratio. The management module 250 is adapted to receive and use several inputs like, inter alia, the CVT drive pulley rotational speed 286, the CVT driven pulley rotational speed sensor 290, the drive mechanism ratio control 432 and an optional programmed key 448. The programmed key 448 might be used to provide additional behavioural information used to further manage the systems behaviours under specific circumstances like reducing the performance for use of a vehicle 14 by a child. Alternatively, the management module 250 could manage both the throttle 444, in the case of an electronically actuated throttle, and the assisted CVT 10, if desirable.

Figure 14:
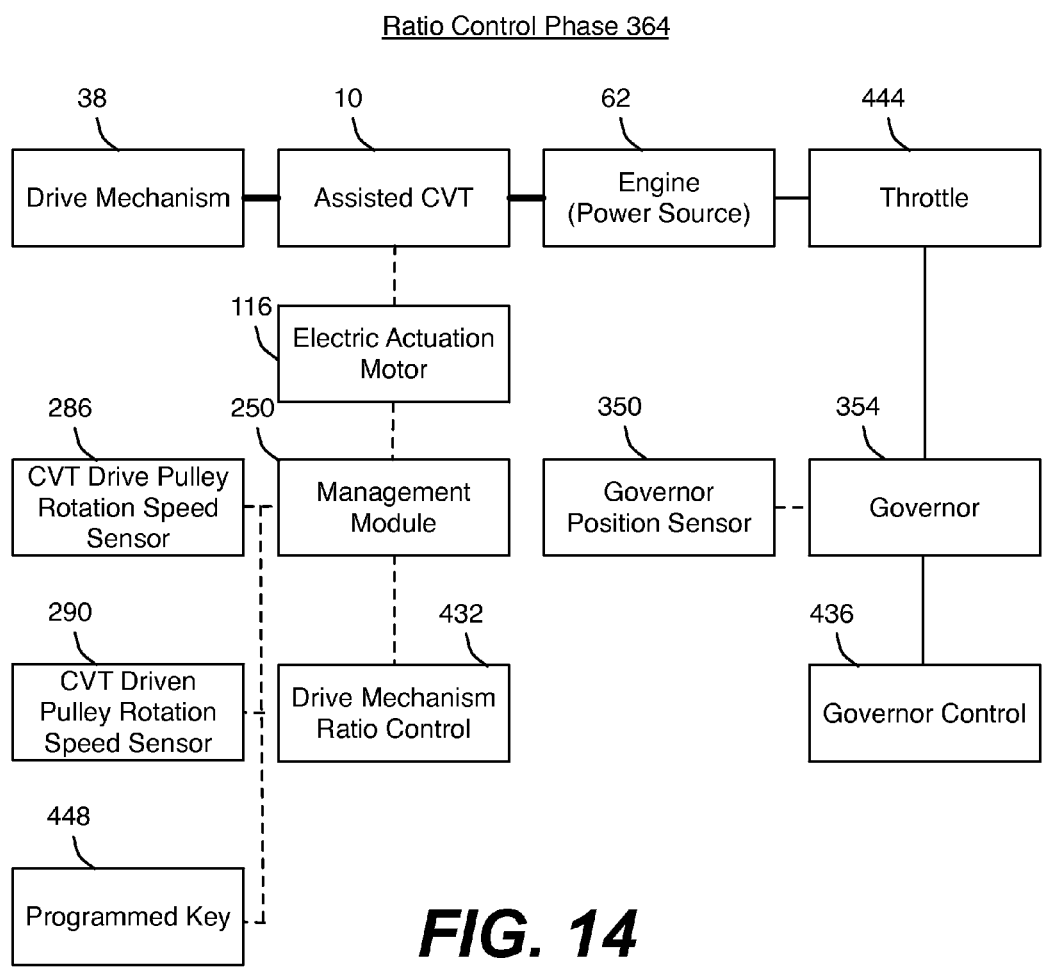
FIG. 14 is a block diagram of an exemplary engine in accordance with an embodiment of the present invention.
Figure 15:
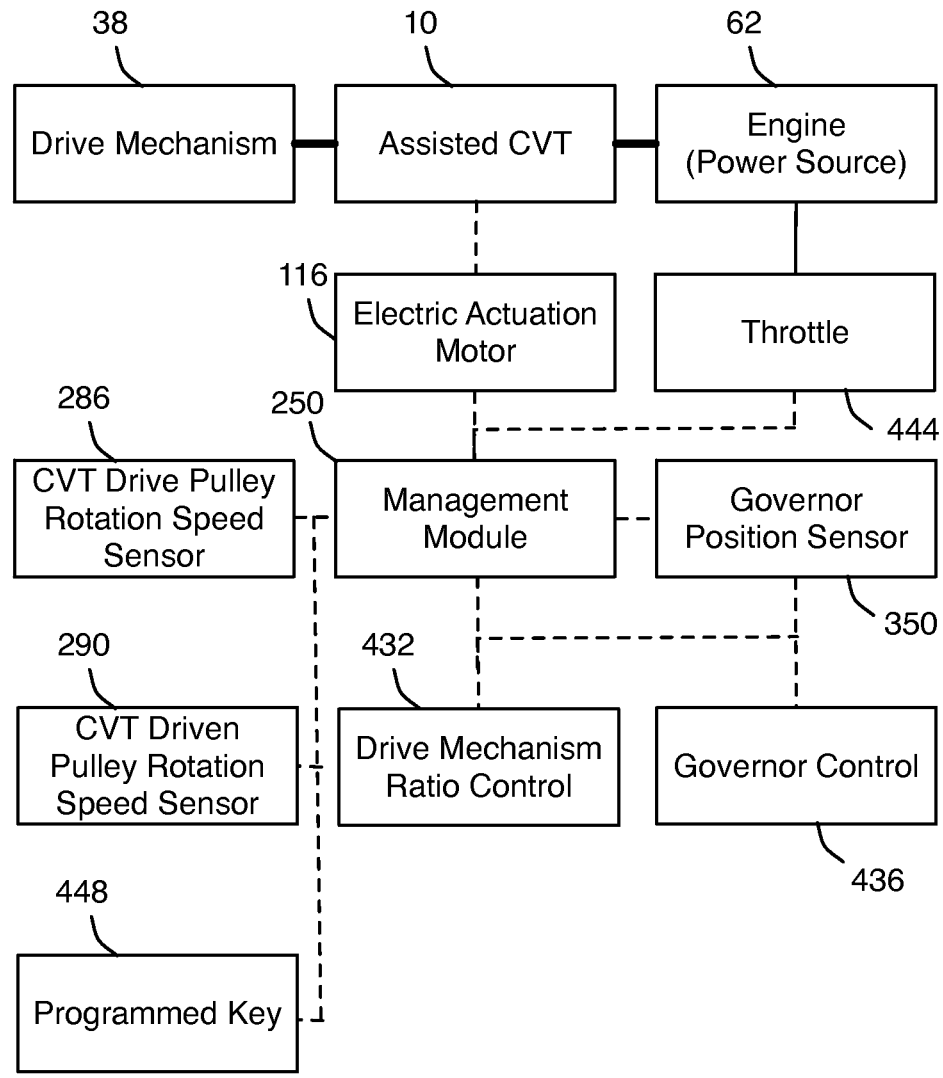
FIG. 15 is a block diagram of an exemplary engine in accordance with an embodiment of the present invention.

FIG. 15 is a possible variation of the system illustrated in FIG. 14 where there is no physical governor 354. The effect that would be provided by the governor 354 is electronically provided by the management of the throttle 444 by the management module 250. The management module 250 is therefore wiredly connected to the governor position sensor 350 and the governor control 436. The governor position sensor 350 collects and transmits data concerning the position of the governor 354 to the management module 250. In turn, the governor control 436 remains accessible to the user to set the target engine rotational speed.

Figure 16:
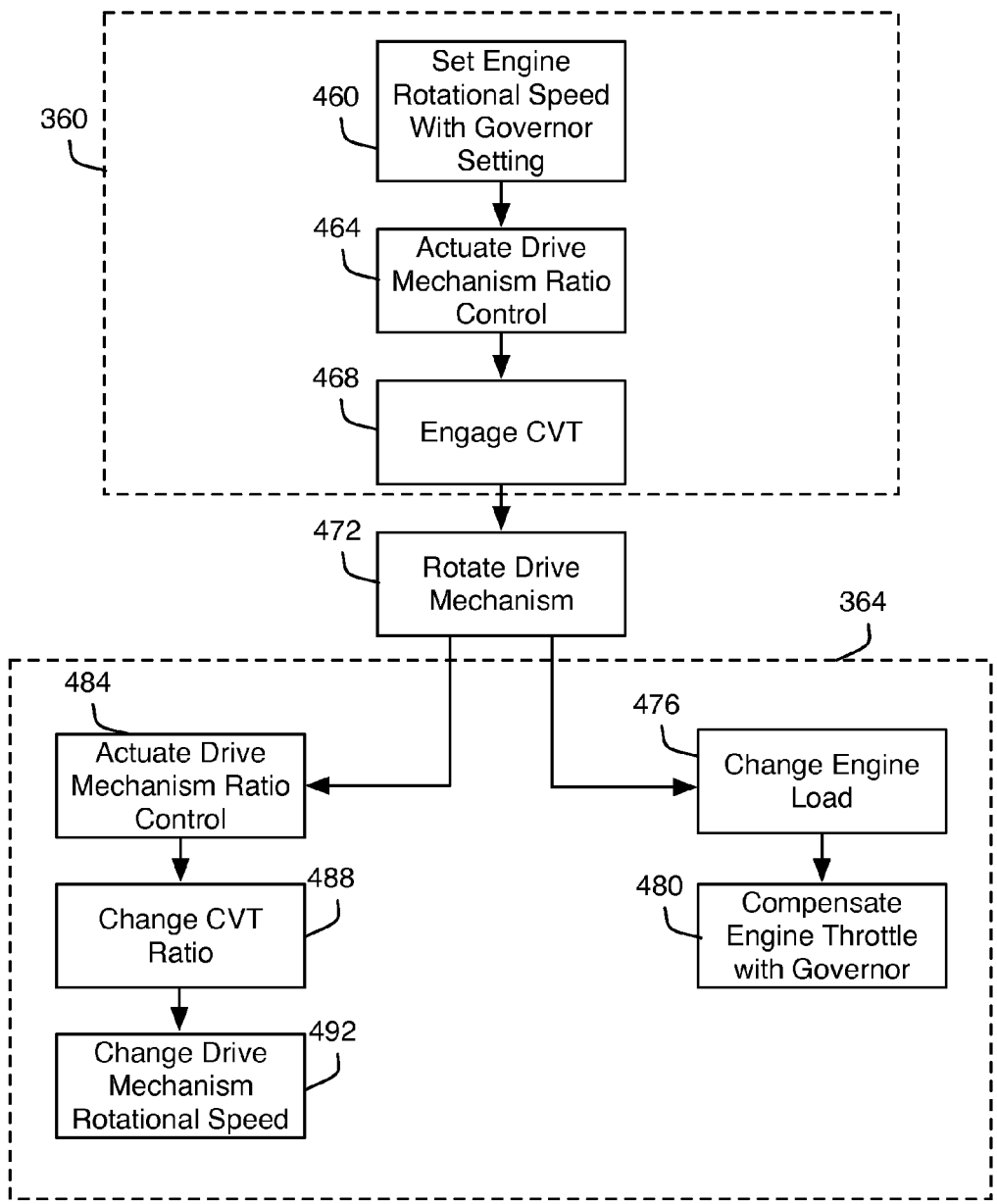
FIG. 16 is a block diagram of an exemplary engine in accordance with an embodiment of the present invention.

Moving now to FIG. 16 showing the engagement phase 360 of the assisted CVT 10 where the setting of the governor 354 establishes the engine 62 rotational speed 460. Then a user actuates the drive mechanism ratio control 464 to engage the drivebelt 26 and determine the speed of engagement of the drive belt 26 with the assisted CVT 10. The ratio control phase 364 follows once the drive mechanism 38 is engaged. The road load can increase or decrease, based on the road conditions or the driver's intents, in the ratio control phase 364. When the load slightly changes 476 there is automatic compensation by the governor 480 that increases or decreases the throttle opening to increase or decrease the engine torque for a predetermined engine 62 rotational speed as it will be discussed below in respect with FIG. 17. Still referring to FIG. 16, the assisted CVT 10 changes the drive mechanism 38 rotational speed 492 to obtain the desired drive mechanism 38 rotational speed by changing its transmission ratio 488 on the basis of the actuation of the drive mechanism ratio control 484; and consequently manages the load applied to the engine 62.

Figure 17:
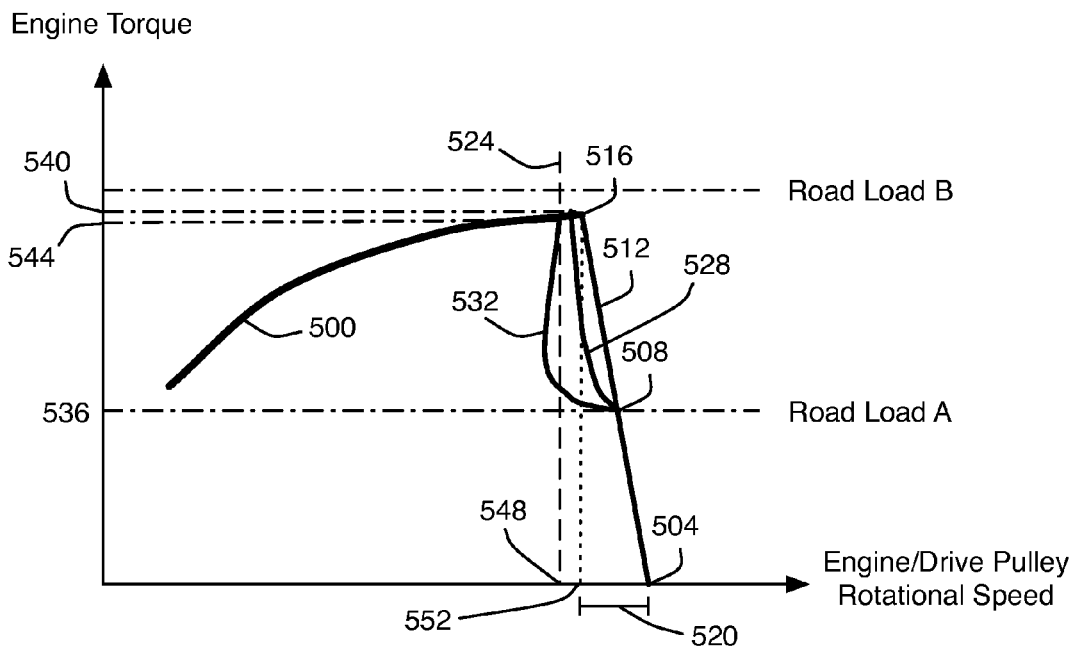
FIG. 17 is a torque v. RPM graph of an exemplary engine torque mapping of an assisted CVT in accordance with an embodiment of the present invention.

A graph illustrating the maximum torque curve 500 of an engine 62 in respect of the engine rotational speed can be appreciated in FIG. 17. On governor-equipped engines 62, the governor setting establishes the engine 62 no load maximum rotational speed 504. The governor 354 is going to automatically adjust the torque 508 of the engine 62 within the torque curve 512 to counterbalance the load applied by the engagement phase 360 and provided by "road load A". A decreasing road load will translate into an automatic and consequent adjustment of the torque by the governor 354. Conversely, an increasing road load will translate into an increase of the torque of the engine 62 by the governor 354 to reach equilibrium until maximum torque 516 is reached.

It has to be noted that the torque curve 512, at rotational speed 504, is not exactly vertical since there is a speed droop 520. As it is well known in the art, the increase in engine speed is proportional to the load change. The resulting phenomenon is known as "speed droop", and one refers to governor 345 with a "speed droop" characteristic. The governor's speed droop 520 is generally referred to the rate of torque reduction (function of the RPM) between the full load speed 516, referring to a criterion 524 rotational speed 548, and the no-load rotational speed 504. Generally speaking, a reasonably large speed droop 520 increases the stability of the complete control loop (governor, engine, and driven machine or vehicle). On the other hand, the speed droop is limited by the operating conditions to about 0%-5% for engine-generator set, and to about 6%-15% for vehicles.

The road load value is suddenly increased up to "road load B" under an increase in load from "road load A". The governor 354 will therefore react to the engine rotating speed reduction by opening the throttle until it reaches maximum torque. At this point, "road load B" is still higher than the engine available torque and consequently the engine 62 will decelerate. Still referring to FIG. 17, the engine 62 is going to reach its maximum torque 516 for a given rotational speed 552 before reaching equilibrium with "road load B". In other words the engine 62 will decrease its rotational speed, and lower its torque, by trying to reach equilibrium with "road load B" that will never be reached because it is above the maximum torque available over the complete torque curve 500. An embodiment of the present invention provides a criterion 524 located a little lower than the maximum torque 516 for a given engine rotational speed 504 with consideration of the speed droop 520. The over-loaded engine 62 is going to meet the criterion 524 when the engine 62 slows down its rotational speed while trying to reach equilibrium with "road load B" applied thereon. When the criterion 524 is reached it causes the assisted CVT 10 to backshift to progressively remove load from the engine 62 until it reaches equilibrium or until the assisted CVT 10 can no more backshift as it has already reached the minimum transmission ratio.

The load application speed and the amount of load are material into the reaction of the governor 354 and the assisted CVT 10. The required engine torque 508 at road load A is going to move along curve 512 until maximum torque 500 is reached when the load is applied and the speed of application is lesser than what the engine 62 can provide to maintain equilibrium. The engine 62 cannot maintain equilibrium if the load and/or the speed of application thereof is higher. This situation is represented by curve 528 illustrating a slight engine rotational speed reduction between road load A and maximum torque 500 without, however, reaching the criterion 524. Curve 532 illustrates a situation where equilibrium is broken by a quick and/or significant load application. This quick load application causes the controller to react to the change in engine rotational speed and the assisted CVT 10 to backshift since the criterion 524 has been reached and exceeded. At the limit, if a very high load is quickly applied to the engine 62, the engine 62 is going to stall. Various delays, like load application delay, engine reaction delay and the like are also variables to be considered with quick and/or significant load applications. It has to be noted that the action of the controller 354 and the assisted CVT 10 can be performed simultaneously or sequentially. We mostly consider a sequential action of the controller 354 and the assisted CVT 10 in the present description.

Figure 18:
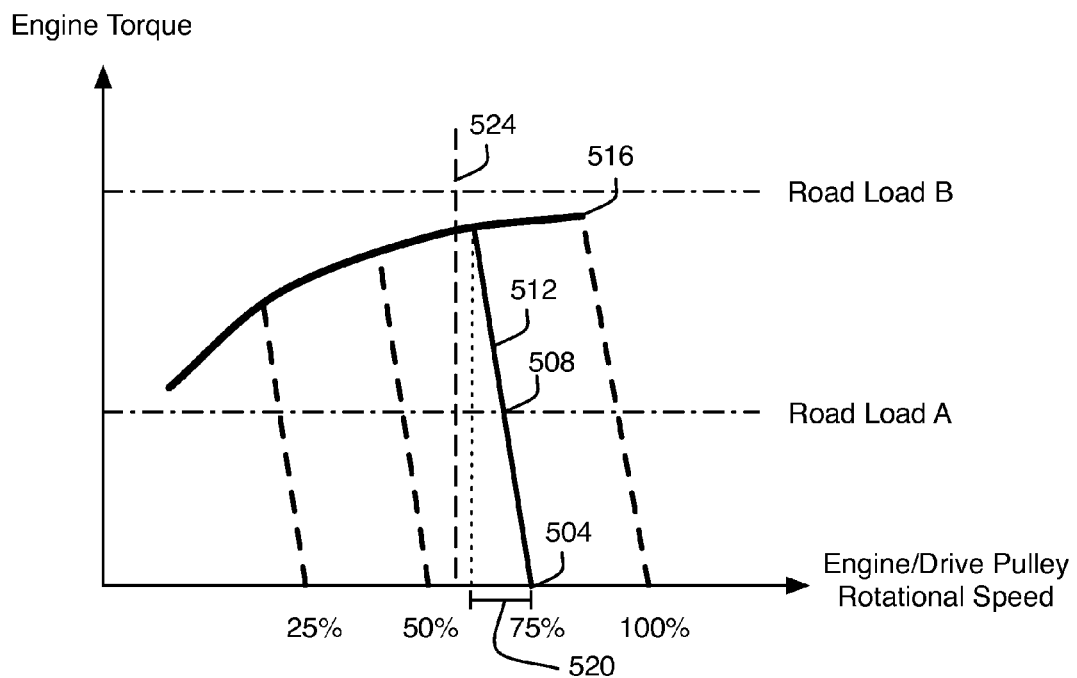
FIG. 18 is a torque v. RPM graph of an exemplary engine torque mapping of an assisted CVT in accordance with an embodiment of the present invention.

The governor setting controls the engine 62 rotational speed with actuation of the throttle 444. The throttle can be set at wide-open throttle (100%) as illustrated in FIG. 17. However, the governor control 436 can set the throttle 444 at different openings as it can be appreciated in FIG. 18 where the same principle is applied for, let's say, for example, 75% throttle opening. In other embodiments the governor control 436 can be positioned anywhere between minimum throttle opening and 100% throttle opening. In another embodiment, the governor control 436 can be selectively positioned in predetermined positions. One example would be the engine speed selection offered between a slow rotational speed, sometimes illustrated with a turtle, and a fast rotational speed, sometimes illustrated with a rabbit. In the latter example only two engine rotational speed positions are offered to a user. Various drivability modes could be offered to a driver. Namely, a normal mode, for fuel economy that manages high torque with low engine rotational speed, a work mode that uses a steady engine rotational speed and uses the assisted CVT 10 to change the speed of the vehicle (could also be considered analogous to a hydrostatic transmission emulation), a sport mode preferring high shift lines for high performance and a manual shift emulation simulated with fixed transmission ratios with the assisted CVT 10. FIG. 18 illustrates four distinct positions of the engine rotational speed governor control 420, namely 25%, 50%, 75% and 100%.

Figure 19:
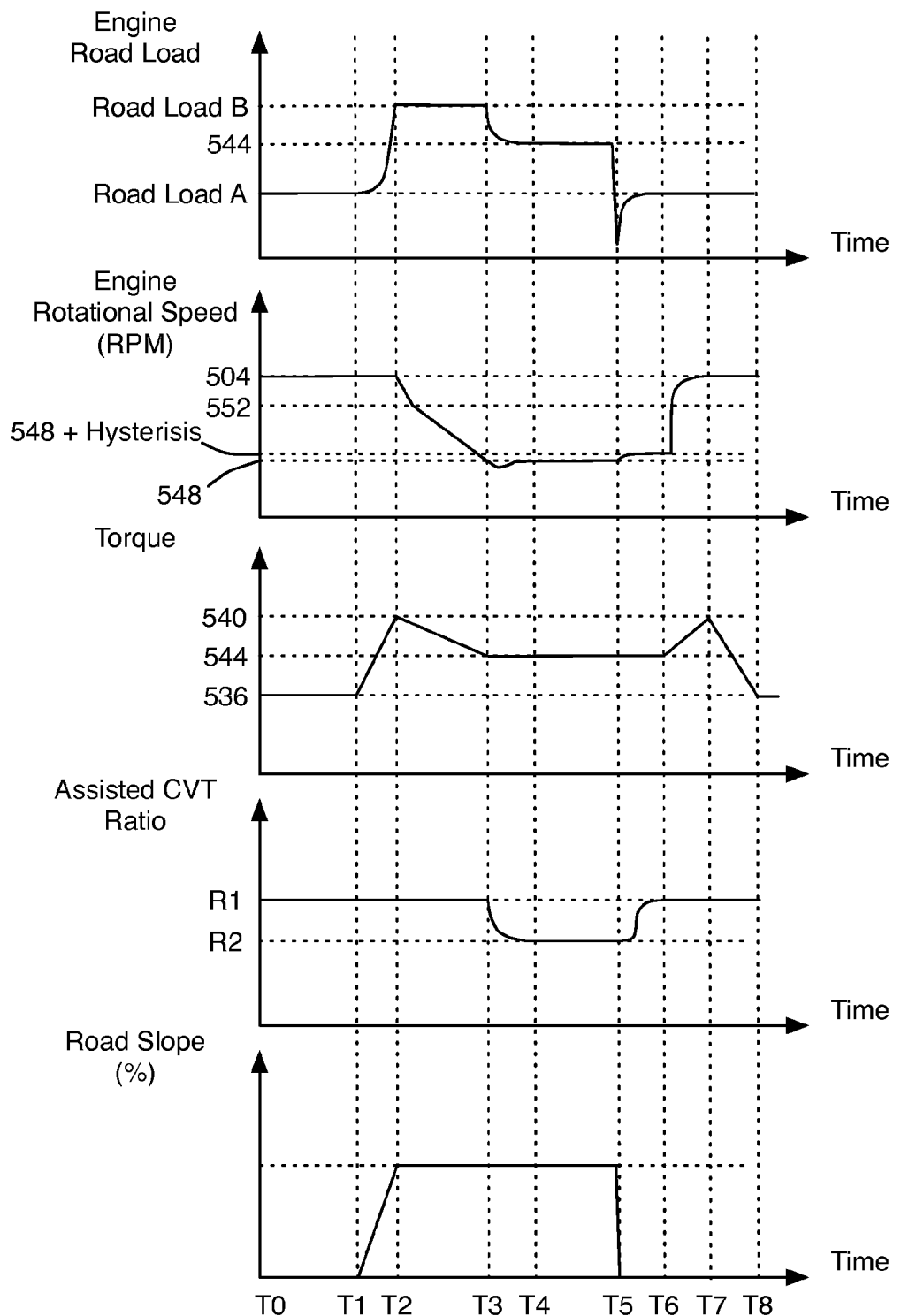
FIG. 19 is a series of related graphs of a mapping of various operating conditions of an assisted CVT in accordance with an embodiment of the present invention.

We now refer to FIG. 19, which can be interpreted in light of FIG. 17, to illustrate the intermingled behavior of different actors of the system along time. Beginning on top of FIG. 19 one can appreciate an illustrative graph relating to the load, the engine rotational speed, the torque, the assisted CVT 10 ratio and the road slope, all in respect of time. One can also appreciate that the action of the governor 354 and the action of the assisted CVT 10 are sequential and not simultaneous in the illustrative example of FIG. 19.

[FIG. 19, T0-T1] At Time 0 (T0) the road load is at "road load A" level until the road slope increases, at Time 1 (T1).

[FIG. 19, T1-T2] The load progressively increases to "road load B" level at Time 2 (T2) because of the road slope increase. During that phase the engine rotational speed will decrease slightly following its speed droop 520 that has been exaggerated for the present explanations. Proportionally to the engine speed droop 520, the torque increases along curve 512, shown in FIG. 17, to level 540 at torque 516.

[FIG. 19, T2-T3] At T2 the load remains constant at "road load B" while the engine rotational speed continue to fall along torque curve 500 (FIG. 17) until criterion 524 is reached at T3 at criterion rotational speed 552. The engine rotational speed falls because requested road load B is higher than the maximum available torque 540 and chokes the engine 62 rotational speed. The torque falls to level 544 because the engine rotational speed falls to level 548.

[FIG. 19, T3-T4] The management module 250 begins acting on the assisted CVT 10 ratio once the torque criterion 524 is reached at T3. The transmission ratio changes between the drive mechanism 38 and unloads the engine 62 until equilibrium is reached at Time 4 (T4). In the present situation the assisted CVT 10 ratio progressively changes from R1 to R2. The engine rotational speed stabilizes at level 548 after a short transition phase. Meanwhile the torque remains stable at level 544 because backshifting the assisted CVT 10 targets the engine rotational speed at the level 548 and will continue to backshift until equilibrium is reached.

[FIG. 19, T4-T5] The system remains at steady state during that period until the road slope gets back to zero at T5.

[FIG. 19, T5-T6] At Time 5 (T5) the road slope gets back to zero and the vehicle is back on a level surface thus reducing the load exercised on the engine 62, which leaves available torque to reaccelerate the engine rotational speed higher than the criterion. Once the engine rotational speed is higher than the criterion, the assisted CVT 10 will then control back the transmission ratio to the targeted value (R1) provided by the drive mechanism ratio control 432, which is ultimately the driver command. By upshifting the assisted CVT, the smaller road load value will get back to the torque level of road load A at Time 6 (T6).

[FIG. 19, T6-T7] The engine rotational speed increases back to level 540 slightly after T6 as there is now available torque to reaccelerate. The torque level will rise in relation with engine speed to maximum available torque 540, point where the governor will start to actuate back the throttle.

[FIG. 19, T7-T8] The governor will close the throttle, thus reducing the torque level from level 540 to level 536 to perfectly match road load A. After T8, the system will remains is in steady state.

Figure 20:
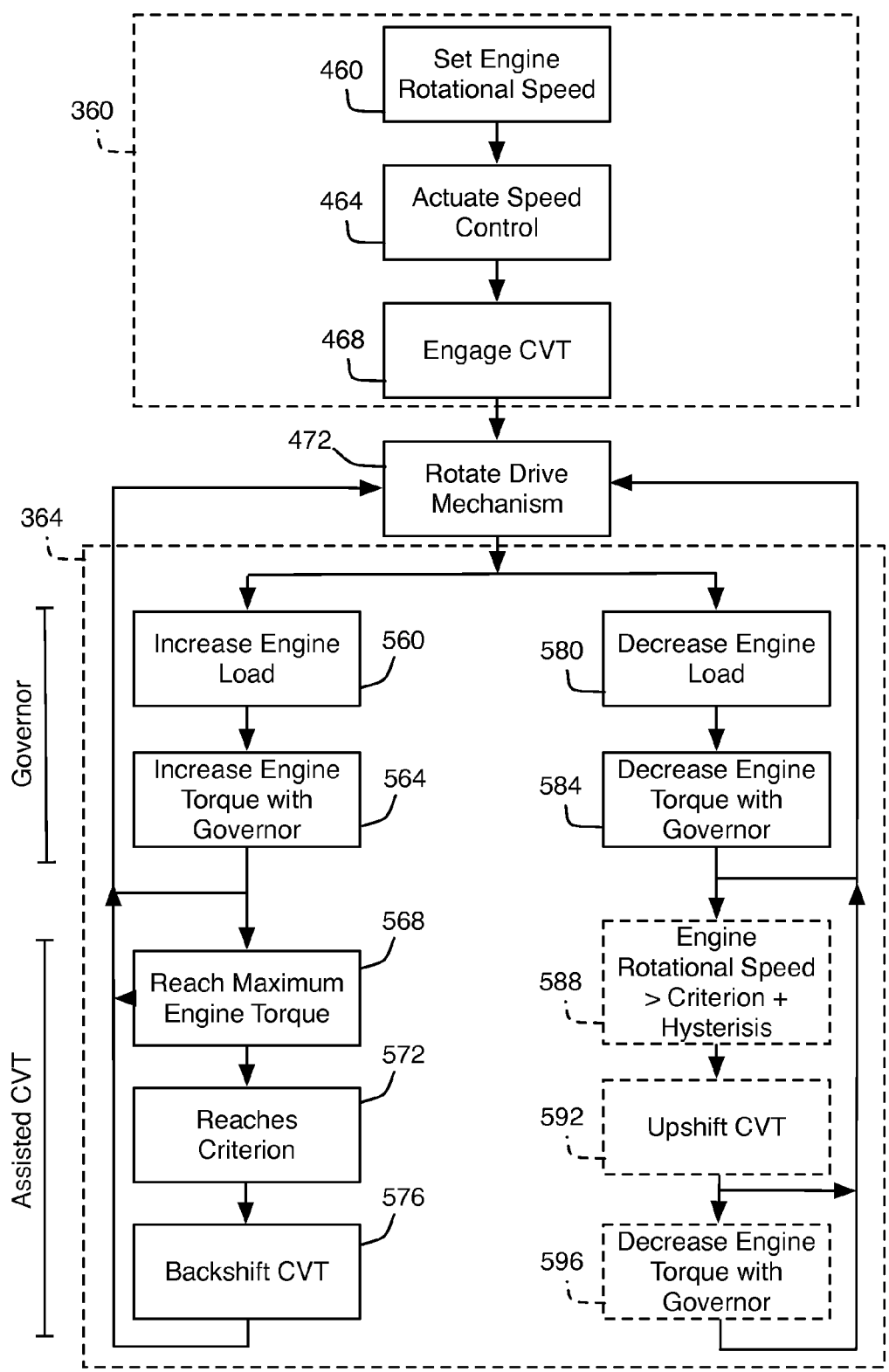
FIG. 20 is a block diagram of an exemplary engine in accordance with an embodiment of the present invention.

Referring now to FIG. 20 illustrating the behavior of the assisted CVT 10 in a flow chart when the load exercised on the system is 1) managed by the governor 354, and 2) extending over the maximum torque curve 500 and managed by a ratio change of the assisted CVT 10. The engagement phase 360 illustrated in FIG. 20 is similar to what has been discussed in respect with FIG. 16 and can be read in light of FIG. 19. The ratio control phase 364 is separated in two modes where the load is increased in the first mode illustrated to the left and wherein the load is decreased in the second mode illustrated to the right. The governor 354 reacts when the engine load increases 560 to increase the torque of the engine 62, 564. The assisted CVT 10 reacts when the governor 354 is saturated, maximum engine torque 568 is exceeded and the engine rotational speed criterion 524 is reached. The assisted CVT 10 backshifts 576 to reduce the load applied to the engine 10. On the other hand, the governor 354 reacts when the engine load decreases 580 to decrease the torque of the engine 62, 584. The assisted CVT 10 could optionally react when the engine rotational speed is higher than the criterion 524. A hysteresis 588 can be used to avoid getting the system into oscillation. The assisted CVT 10 would upshift 592 to increase the load applied to the engine 10. The governor 354 could also be used to decrease 596 the engine torque.

Figure 21:
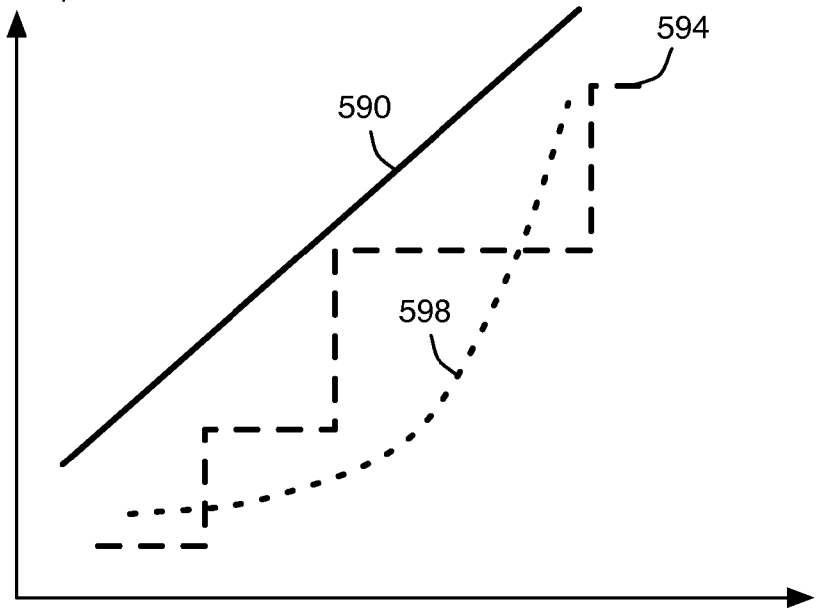
FIG. 21 is a graph of a drive mechanism ratio control actuation speed vs drive pulley sheaves positions mapping of various operating conditions of an assisted CVT in accordance with an embodiment of the present invention.

The assisted CVT 10 can change ratio in various ways when there is a discrepancy between the actual engine rotation speed and the required engine rotational speed. FIG. 21 illustrates an exemplary graph where the assisted CVT 10 change rate, when the CVT ratio changes, can be made linearly 590, with steps 594 or exponentially 598. Other possibilities may become apparent to a person skilled in the art and remain within the realm of the present disclosure. Slipping between the drive pulley 100 and the drivebelt 26 can be allowed upon transmission ratio transition and may be desirable under specific circumstances like within the engagement phase 360.

The drive mechanism ratio control 432 is adapted to be actuated by a user in the case of a vehicle. FIG. 21 illustrates possible transmission ratios between the drive mechanism ratio control 432 actuation speed and the sheaves position of the drive pulley 100. The speed of actuation of the drive mechanism ratio control 432 provides information about the intent of the user as to how the drive mechanism 38 should behave. For example, if the drive mechanism ratio control 432 is slowly actuated, the drive belt engagement speed is going to be actuated accordingly, conversely, if the drive mechanism ratio control 432 is quickly actuated, the drive belt engagement rate is going to be high. The same principle can be applied to the displacement as it can be appreciated in FIG. 23. For instance, if the drive mechanism ratio control 432 is not much actuated, lest say 25% actuated, the drive belt engagement rate is going to be slowly actuated, in contrast, if the drive mechanism ratio control 432 is significantly actuated, for instance full throttle is applied (100% actuation), the drive belt engagement speed is going to be high. The correlation between the drive mechanism ratio control displacement and the drive pulley sheave actuation speed might be linear 614, in steps 618 or non-linear 622. As it can be appreciated in FIG. 21 and FIG. 22, both the speed and the displacement of the drive mechanism ratio control 432 can be used individually or collectively to define the drive pulley belt engagement behavior. Here again other possibilities may become apparent to a person skilled in the art and remains within the realm of the present disclosure.

The management of an assisted CVT 10 in accordance with embodiments of the present invention gives access to a number of conditions that could lead to some critical transmission behaviors. One of these conditions is created when the rotational speed of the drive pulley 100 of an assisted CVT 10 is set high prior to engaging the drivebelt 26. A slow engagement of the drivebelt 26 with drive pulley 100 while the drive pulley rotational speed is high could result into overheating and permanently damaging the drivebelt 26. That condition is unlikely to happen with a conventional mechanical CVT that is designed to engage the drivebelt 26 at a predetermined engine rotational speed. Put otherwise, it is hard to overheat the drivebelt 26 when the CVT is configured to engage completely the drivebelt 26 at a predetermined low rotational speed.

The friction coefficient of a drivebelt 26 changes when the drivebelt 26 is hot is heated. This is to say that significant undesired friction between the sheaves 100 and the drivebelt 26 is going to change the behavior of the CVT engagement. An intense friction between the sheaves 100 and the drivebelt 26 is going to severely abuse the drivebelt 26 and makes grooves thereon in addition to damaging the drivebelt 26 material. This can happen during the engagement phase 360, the disengagement phase and when the torque to be transmitted is higher than the torque that can be transmitted by the drive pulley 100. One can appreciate that a portion of the friction-generated heat is going to be sunk into the drive pulley 100 itself.

There is energy transfer to the drivebelt 26 in the form of heat when there is slipping thereof. This energy can be considered to be equivalent to the integration of the slipping speed product multiplied by the transferred torque as illustrated in Equation 1. Where E is the sliding energy, T is the transmitted torque, $N_1$ is the rotating speed of the drive pulley, $N_2$ is the rotating speed of the driven pulley and R is the minimum radius of the drivebelt 26.

$$E = \int_0^t T \times (N_1 - (N_2 \div R))$$

Equation 1

Another factor to consider is the movement of the drivebelt 26 in respect with the location where friction occurs. A first situation is identified if the drivebelt 26 remains in place (identified with a "0" in Table 1 below) and a second situation is identified when the drivebelt 26 moves (identified with a "1" in Table 1 below). Friction is going to have a more pronounced effect on the drivebelt 26 if the latter does not move because friction is going to be made at the same location on the drivebelt 26. Conversely, friction is not going to be made always at the same location on the drivebelt 26 if the drivebelt 26 moves and it will take more friction to reach a temperature high enough to damage the drivebelt 26. This is the difference between engaging the drivebelt 26 when a vehicle 14 moves and when the vehicle 14 does not move. The drivebelt 26 is not moving if the vehicle 26 does not move because it is held by the driven pulley and the drivebelt 26 is going to be abused and damaged more quickly. The following logic concerning dissipation factor "F" is respected: F2<F3<F1<F4.

TABLE 1

| # | Does the Drivebelt Slip? $\|N_1 - N_2 \div R\| >$ Threshold | Does the Drivebelt Move? $N_2 >$ Threshold | Dissipation Factor |
|---|---|---|---|
| 1 | 1 | 1 | 2x(F1) |
| 2 | 1 | 0 | 1x(F2) |
| 3 | 0 | 0 (idle) | 1x(F3) |
| 4 | 0 | 1 (fully engaged) | 3x(F4) |

Legend:
1 = yes;
0 = no

Figure 23:
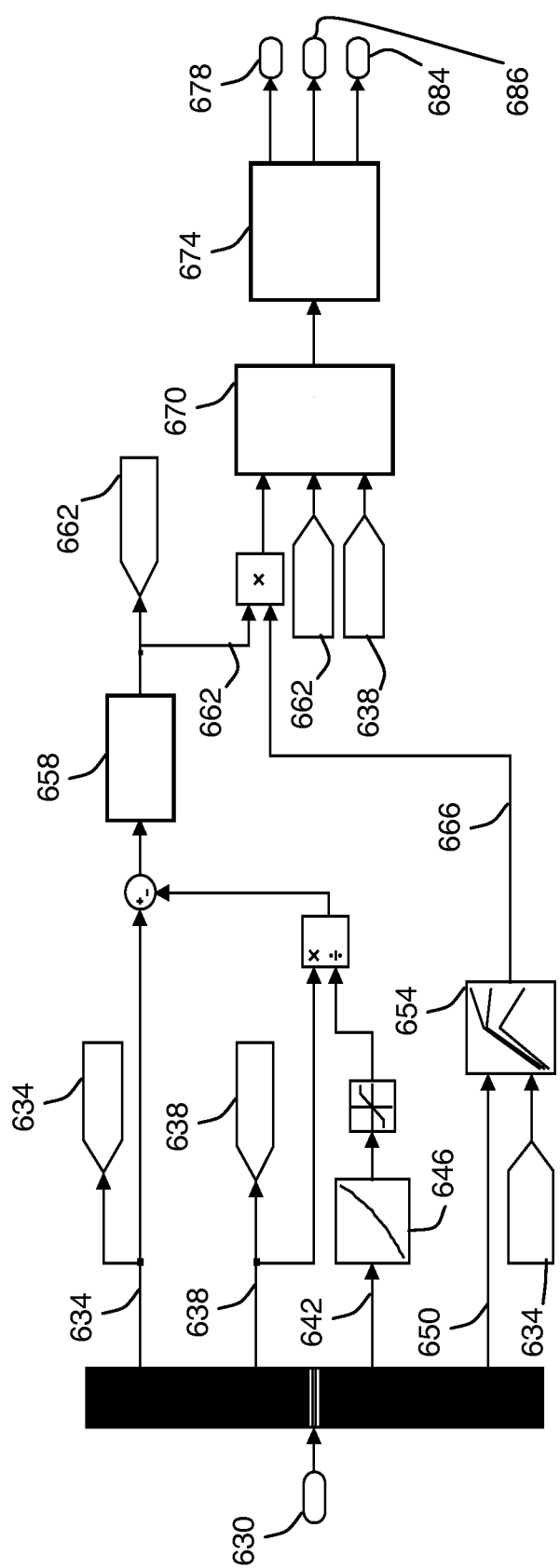
FIG. 23 is a schematic diagram of a system capable of determining drivebelt slippage of an assisted CVT in accordance with an embodiment of the present invention.

Now referring to FIG. 23 illustrating an electronic flow chart of a possible embodiment of the invention adapted to determine the drivebelt 26 temperature 674. An input bus 630 is adapted to receive data about the drive pulley rotational speed 634, a driven pulley rotational speed 638, the drive pulley sheave axial position 642 sending its position signal to a transmission ratio table 646 in function of the throttle position setting (or the governor setting) 650. The throttle position setting 650 (or the governor setting) is going to be used to find the instant torque using a mapping of the engine torque in function of the governor setting and engine rotational speed 654. On the other side the drive pulley rotational speed 634, the driven pulley rotational speed 638 and the drive pulley displacement position 642 are used to find the slip speed, in RPM, that is converted into Radian per second 658. The instant slip speed in Radian per second 662 is used with the instant torque 666, providing a measure in Watts, with the slip speed 662 and the driven pulley rotational speed 638 to find a drivebelt 26 temperature 670. The drivebelt temperature 670 is used with a particular transmission management logic, 674 to determine the action(s) to be taken 678, 682, 686.

The actions can be taken simultaneously or independently. One example uses three-color lamps, namely yellow, orange and red, that can go off when a specific drivebelt temperature is detected. For instance, at 50 deg. C. the yellow lamp 678 goes off in the line of sight of the driver to warn the driver that the drivebelt has reached an unusual temperature, at 65 deg. C. the orange lamp 678 goes off to further warn the driver to slow down, and at 80 deg. C the red lamp 678 goes off warning the driver to stop the vehicle 14. Another possible example is to have three actions taken when different conditions are met. For example, the yellow lamp 678 goes off in the line of sight of the driver, at 65 deg. C. the red lamp 678 goes off and at 80 deg. C. the engine 62 is stopped. Other actions can be triggered when predetermined conditions are met, namely, warning a user with sound, image, lights, text on a display, managing the timing of the engine 62, managing the throttle 444 of the engine 62 to modulate the power thereof, disengaging the drivebelt 26 or, inter alia, further pinching the drivebelt 26 to increase the friction force thereof. The optional display is used to transmit data, information or the like to the driver. Information about, inter alia, the ratio of the transmission, the set engine rotational speed threshold and the reach of the operating limit of the transmission. For instance, if slippage occurs, as explained above, an indication can be sent to the display to warn the rider of the vehicle, or the operator of the industrial equipment.

Figure 24:
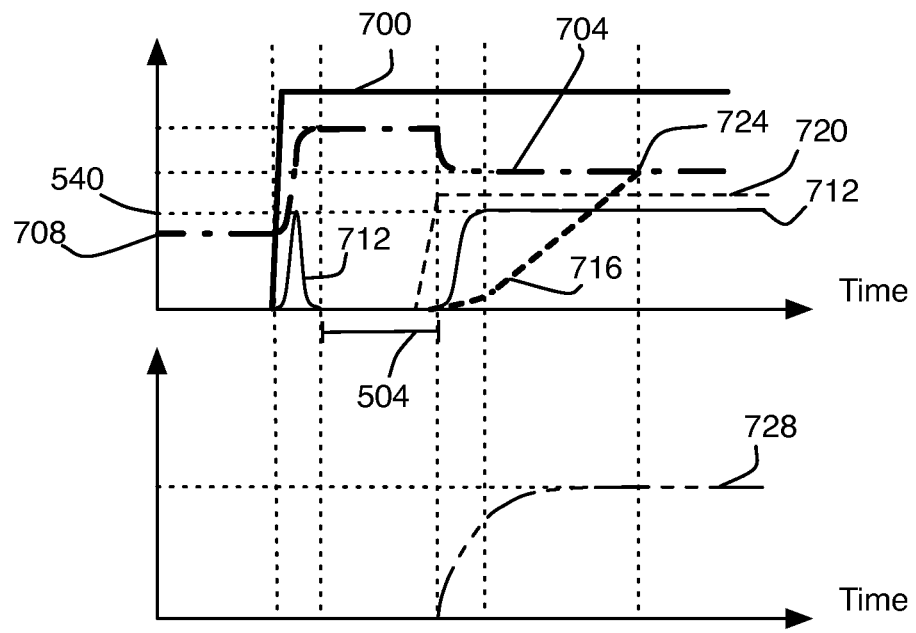
FIG. 24 is a double graph illustrating various operating conditions of a legacy mechanically actuated CVT.
Figure 25:
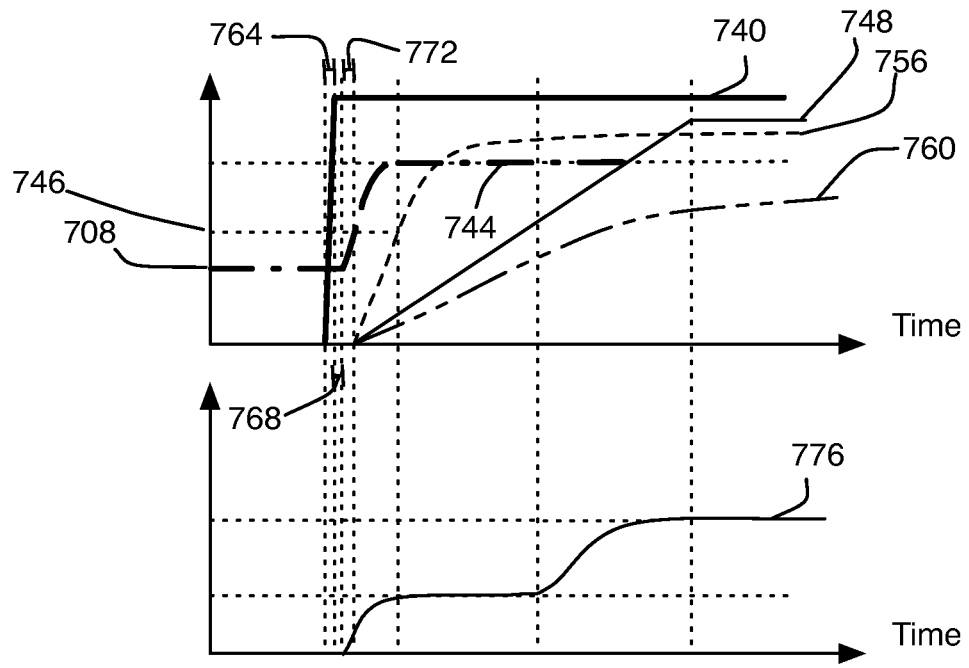
FIG. 25 is a double graph illustrating various operating conditions of an emulated hydrostatic transmission using an assisted CVT in accordance with an embodiment of the present invention.

We will now illustrate differences between the behavior of an assisted CVT 10, in FIG. 24, and the behavior of a conventional mechanical CVT in FIG. 25 to show that the assisted CVT 10 can engage at a much higher engine rotational speed than a mechanical CVT. High engine rotational speed engagement implies risks of drivebelt 26 abuse that are not possible in a mechanical CVT with a standard clutching setup engaging a moderate rotational speed.

More precisely, in respect with FIG. 24, one can appreciate that many graphs are superposed on the upper graph portion and that they each have their respective "Y" axis units. Curve 700 represents the governor 354 setting (in percent between 0-100%). Curve 704 is the engine 62 rotational speed (in RPM) where the idle is indicated with numeral reference 708. The engine torque curve 712 (in Nm) is represented in two sections where the gap therebetween represents state 504 from FIG. 17. Curve 716 represents the drive pulley rotational speed (in RPM). Finally, curve 720 illustrates the engagement behavior control 424 travel (in %) and curve junction 724 is where the drivebelt 26 is fully engaged and rotates at the same rotational speed as the engine 62 rotational speed. In turn, on the lower graph portion of FIG. 24, is represented the vehicle 14 speed curve 728 along time. One can visualize from FIG. 24 that a hydrostatic emulation with an assisted CVT 10 can slowly engage the drivebelt 26 when the engine rotational speed 704 is high and that the drivebelt 26 can be abused if not managed properly.

Similar graphs are illustrated in FIG. 25 for a mechanically actuated CVT. Here again many graphs are superposed on the upper graph portion of FIG. 25 and they each have their related "Y" axis units. Curve 740 is the throttle 444 position (between 0-100%). Curve 744 is the engine rotational speed (in RPM) where the idle is indicated with numeral reference 708 and where the drivebelt 26 begins to engage is indicated with numeral reference 746. Curve 748 represents the shift line rotational speed (in RPM). Curve 756 illustrates the clutching loss (J). Finally, curve 760 illustrates the vehicle 14 speed in respect of time. Gap 764 represents the throttle position sensor travel from 0-100%. Gap 768 illustrates the engine response time and gap 772 represents the CVT lag time. In turn, on the lower graph portion of FIG. 25, is represented the vehicle torque curve 776 along time. It can thus be appreciated that the engagement speed of the drivebelt 26 is made at a lower engine rotational speed 708 because the engagement speed in function of the drive pulley rotating speed.

Figure 26:
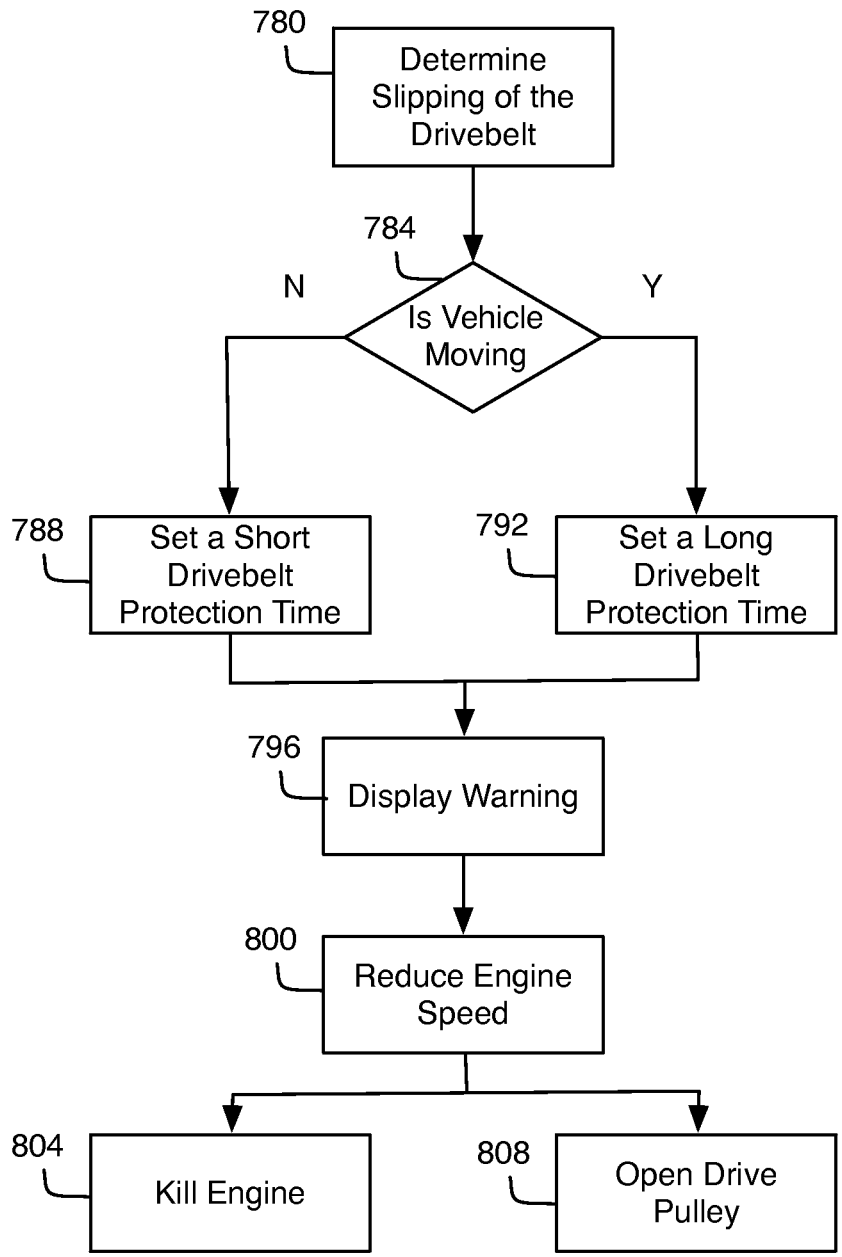
FIG. 26 is a flow chart of a possible series of steps to determine possible drivebelt abuse with an assisted CVT in accordance with an embodiment of the present invention.

FIG. 26 illustrates a flow chart where the amount of slipping is determined 780 and the conditions are going to be decided upon determination 784 of the possible movement of the vehicle 14. If the vehicle 14 doesn't move, a relative short drivebelt 26 protection time is set by the system 788 to prevent inducing damages to the drivebelt 26 that remains in place and sustain friction at a single location thereof. In contrast, if the vehicle 14 is moving, a longer protection time is set by the system 792 to prevent inducing damages to the drivebelt 26 that rotates and does not sustain friction at a single location. When the respective protection time is over there is a communication with the driver via a warning message on a display 796. Another action is going to be made and the engine management is reducing the engine rotational speed 800 to reduce the heat transmitted to the drivebelt 26. After, if slipping is still detected, the management system 250 can kill the engine 804 or open the drive pulley 808 to release the drivebelt 26 and prevent further abuse thereof. These are illustrative examples of how the system can detect a possible drivebelt abuse without having a direct or a calculated temperature reading of the drivebelt. In the present situation, slipping of the drivebelt is detected with the rotational speed difference between the drive pulley and the driven pulley in addition to the position of the drive sheaves.

Another embodiment of the present invention applicable to an assisted CVT 10 provides sensors (not shown) used to sense the temperature of the drivebelt 26 in respect of time. This is made in collaboration with the management module 250 that interprets an unusual rise in the temperature of the drivebelt 26 as a slippage between the sheaves 100 and the drivebelt 26 is causing friction, thus increasing the drivebelt 26 temperature. The management module 250 can react by, for instance, sending instructions to pinch with more strength the drivebelt 26 between the sheaves 100 and therefore prevent any slippage thereof. Slippage can also be anticipated by the management module 250, by interpolating pre-set mappings stored therein, based, inter alia, on the torque provided by the engine 62, the rotational speed of the engine 62, the position of the sheaves and the speed of the vehicle 14 or drive output speed of a stationary machine. engage when the engine rotational speed 704 is high and that the drivebelt 26 can be abused if not managed properly.

Similar graphs are illustrated in FIG. 25 for a mechanically actuated CVT. Here again many graphs are superposed on the upper graph and they each have their related "Y" axis units.

Curve 740 is the throttle 444 position (between 0-100%). Curve 744 is the engine rotational speed (in RPM) where the idle is indicated with numeral reference 708 and where the drivebelt begins to engage is indicated with numeral reference 746. Curve 748 represents the shift line rotational speed (in RPM). Curve 752 illustrates the clutching loss 756 (J). Finally, curve 760 illustrates the vehicle 14 speed in respect of time. Gap 764 represents the throttle position sensor travel from 0-100%. Gap 768 illustrates the engine response time and gap 772 represents the CVT lag time. In turn, on the lower graph portion of FIG. 25, is represented the vehicle torque curve 776 along time. It can thus be appreciated that the engagement speed of the drivebelt 26 is made at a lower engine rotational speed 708 because the engagement speed in function of the drive pulley rotating speed.

FIG. 26 illustrates a flow chart where the amount of slipping is determined 780 and the conditions are going to be decided upon determination 784 of the possible movement of the vehicle 14. If the vehicle 14 doesn't move, a relative short drivebelt 26 protection time is set by the system 788 to prevent inducing damages to the drivebelt 26 that remains in place and sustain friction at a single location. In contrast, if the vehicle 14 is moving, a longer protection time is set by the system 792 to prevent inducing damages to the drivebelt 26 that rotates and does not sustain friction at a single location. When the respective protection time is over there is a communication with the drive via a warning message on a display 796. Another action is going to be made and the engine management is reducing the engine rotational speed 800 to reduce the heat transmitted to the drivebelt 26. After, if slipping is still detected, the management system can kill the engine 804 or open the drive pulley 808 to release the drivebelt 26 and prevent further abuse thereof. These are illustrative examples of how the system can detect a possible drivebelt abuse without having a direct or a calculated temperature reading of the drivebelt. In the present example. In the present situation, slipping of the drivebelt is

What is claimed is:

1. A method of managing a transmission ratio with an assisted continuously variable transmission CVT adapted to transmit motive power between a power source and a drive mechanism operatively connected to the power source with the assisted CVT, the CVT comprising a pair of pulleys interconnected with a belt, the method comprising:
managing a substantially constant power source rotational speed of the power source with a governor;
managing a power source torque output of the power source with the assisted CVT; and
managing a transmission ratio of the assisted CVT to manage the rotational speed of the drive mechanism, on a basis of a drive mechanism load variation and a CVT input rotational speed, to maintain a substantially constant power source rotational speed, whereby the CVT matches the power source torque output with the drive mechanism load.

2. The method of claim 1, wherein an actuation of an engagement behavior control is adapted to manage an engagement of the power source with the drive mechanism.

3. The method of claim 2, wherein the engagement behavior control is adapted to have a non-proportional correspondence with the engagement of the power source with the drive mechanism.

4. The method of claim 2, wherein the engagement is determined on the basis of one of an actuation speed of the engagement behavior control and a displacement of the engagement behavior control.

5. The method of claim 1, wherein the substantially constant rotational speed of the power source is predetermined with a reference power source rotational speed.

6. The method of claim 5, wherein the reference power source rotational speed is provided by a power source rotational speed governor control.

7. The method of claim 1, wherein there is a simultaneous management of the assisted CVT transmission ratio and the power source torque output to manage the speed of the drive mechanism and to maintain the substantially constant power source rotational speed.

8. The method of claim 1, wherein the management of the transmission ratio of the assisted CVT is made on the basis of a drive mechanism ratio control actuation to determine the rotational speed of the drive mechanism while maintaining the power source at a substantially constant rotational speed.

9. The method of claim 8, wherein the drive mechanism ratio control and a vehicle engagement behavior control are the same control.

10. The method of claim 8, wherein the drive mechanism ratio control have a non-linear correspondence with the management of the transmission ratio of the assisted CVT.

11. The method of claim 1, wherein the assisted CVT is adapted to remain engaged with a drivebelt and further comprises a controllable clutch adapted to selectively couple the assisted CVT with the power source.

12. The method of claim 1, further comprising a criterion, which is satisfied when the load applied to the power source by the drive mechanism reduces the power source rotational speed, adapted to backshift an assisted CVT to reduce the load applied to the power source by the drive mechanism.

13. The method of claim 1, wherein the assisted CVT is used to change the rotational speed of the drive mechanism when the engine remains at a substantially constant rotational speed.

14. A system for emulating a hydrostatic transmission comprising:
an assisted continuously variable transmission CVT, comprising a pair of pulleys interconnected with a belt, adapted to operatively interconnect a power source with a drive mechanism, the power source being adapted to be maintained at a substantially constant rotational speed with a governor;
a management module adapted to manage the assisted CVT;
an engagement behavior control, operatively connected to the management module, adapted to manage an engagement of the assisted CVT;
a power source rotational speed control connected to the management module; and
a drive mechanism ratio control connected to the management module, the assisted CVT ratio, adapted to define the rotational speed of the drive mechanism, being made on the basis of an actuation of the drive mechanism ratio control, of drive mechanism load variation and a CVT input rotational speed, to maintain a substantially constant power source rotational speed, whereby the CVT substantially matches the power source torque output with the drive mechanism load.

15. The system of claim 14, further comprising a power source rotational speed criterion, and wherein the governor is adapted to manage a torque provided by the power source and wherein the assisted CVT is adapted to change the transmission ratio between the power source and the drive mechanism.

16. The system of claim 15, wherein the power source rotational speed criterion is lower than a predetermined rotational speed of the power source and wherein the assisted CVT backshifts when the rotational speed of the power source reaches the criterion to reduce the load applied to the power source by the drive mechanism.

17. A vehicle including a power source and an assisted continuously variable transmission CVT capable of emulating an hydrostatic transmission, the power source being operatively connected to a governor adapted to maintain a power source rotational speed at a substantially constant rotational speed while managing a torque provided by the power source to react to a load applied to the power source by a drive mechanism, the assisted CVT, comprising a pair of pulleys operatively interconnected with a belt, being adapted to backshift to reduce the load applied to the power source by the drive mechanism when the load applied to the power source by the drive mechanism reduces the rotational speed of the power source.

18. The vehicle of claim 17, further comprising a vehicle engagement behavior control adapted to manage the assisted CVT engagement and a drive mechanism ratio control adapted to manage a transmission ratio of the assisted CVT between the power source and the drive mechanism.

* * * * *